(12) United States Patent
Schmidtler et al.

(10) Patent No.: US 12,596,841 B2
(45) Date of Patent: Apr. 7, 2026

(54) ANONYMIZING PERSONAL INFORMATION FOR USE IN ASSESSING FRAUD RISK

(71) Applicant: Trulioo, Vancouver (CA)

(72) Inventors: Mauritius Schmidtler, Escondido, CA (US); Hal Lonas, Carlsbad, CA (US); Chahm An, Poway, CA (US); Nathan Russo, San Diego, CA (US); Etienne Doidic, Redondo Beach, CA (US)

(73) Assignee: Trulioo, Vancouver (CA)

( * ) Notice: Subject to any disclaimer, the term of this patent is extended or adjusted under 35 U.S.C. 154(b) by 75 days.

(21) Appl. No.: 18/482,601

(22) Filed: Oct. 6, 2023

(65) Prior Publication Data

US 2024/0119178 A1 Apr. 11, 2024

Related U.S. Application Data

(60) Provisional application No. 63/378,624, filed on Oct. 6, 2022.

(51) Int. Cl.
*G06F 21/62* (2013.01)
(52) U.S. Cl.
CPC ................................ *G06F 21/6254* (2013.01)
(58) Field of Classification Search
CPC .................................................. G06F 21/6254
See application file for complete search history.

(56) References Cited

U.S. PATENT DOCUMENTS

| | | | | |
|---|---|---|---|---|
| 10,687,174 B1 * | 6/2020 | Hartzell | ............. | G06F 16/9537 |
| 12,229,308 B1 * | 2/2025 | Guerra | ............... | G06F 21/6245 |
| 2017/0132607 A1 * | 5/2017 | Lee | ......................... | G06Q 20/34 |
| 2019/0278760 A1 * | 9/2019 | Smart | .................. | G06F 16/2264 |
| 2019/0312941 A1 * | 10/2019 | Maccini | ................. | H04H 60/88 |
| 2020/0019994 A1 * | 1/2020 | Hartzell | ................... | H04W 4/23 |
| 2021/0026987 A1 * | 1/2021 | Woessner | ........... | G06F 21/6263 |
| 2021/0075798 A1 * | 3/2021 | Krasser | .................. | G06N 20/00 |
| 2021/0158221 A1 * | 5/2021 | Marlin | .................. | G06F 11/079 |
| 2021/0158222 A1 * | 5/2021 | Malaya | .................... | G06N 3/04 |
| 2022/0030382 A1 * | 1/2022 | Klasson | ................... | G06N 5/01 |
| 2022/0188699 A1 * | 6/2022 | Matlick | .............. | G06F 21/6254 |
| 2023/0185908 A1 * | 6/2023 | Khanna | ................. | G06F 21/554 |
| | | | | 726/25 |
| 2024/0005020 A1 * | 1/2024 | Lavine | ................ | G06F 21/6218 |

(Continued)

OTHER PUBLICATIONS

International Search Report and Written Opinion mailed on Feb. 6, 2024 in PCT Appl. No. PCT/US23/76263, 11 pages.

*Primary Examiner* — Stephen T Gundry

(57) ABSTRACT

Systems and methods for anonymizing personal information are provided. A set of data may be received that includes a first subset of data that corresponds to a unique identifier, a second subset of data that corresponds to a timestamp, and a third subset of data that corresponds to a personal identifiable information (PII) record. The PII record may include a plurality of fields, one or more of which may include values. The set of data may be pre-processed. A respective embedding may be generated, for each value of a respective field, of the plurality of fields, that includes a value. The pre-processed set of data may be anonymized to generate an anonymized set of data, in the form of a graph structure. The graph structure may be stored in a database, and a fraud risk model may be trained, based on the database.

20 Claims, 19 Drawing Sheets

(56)　　　　　References Cited

U.S. PATENT DOCUMENTS

| | | | |
|---|---|---|---|
| 2024/0005432 A1* | 1/2024 | Aman | G16H 50/80 |
| 2024/0112080 A1* | 4/2024 | Harris | G06N 3/042 |
| 2025/0021682 A1* | 1/2025 | Ricotta, Jr. | G06F 21/6218 |
| 2025/0023743 A1* | 1/2025 | Carson | H04L 9/3239 |
| 2025/0103729 A1* | 3/2025 | Chan | H04L 63/20 |
| 2025/0111225 A1* | 4/2025 | Cook | G06N 3/09 |
| 2025/0111367 A1* | 4/2025 | Kopf | H04L 9/3239 |
| 2025/0124169 A1* | 4/2025 | Di Valentino | G06F 21/6254 |

* cited by examiner

100

302 — RECEIVE A SET OF DATA

304 — PRE-PROCESS THE SET OF DATA

306 — ANONYMIZE THE PRE-PROCESSED SET OF DATA TO GENERATE AN ANONYMIZED SET OF DATA

308 — PROVIDE AN OUTPUT COMPRISING ONE OR MORE INDICATIONS CORRESPONDING TO A UNIQUE ID, TIMESTAMP, AND THE ANONYMIZED SET OF DATA

310 — RECEIVE THE OUTPUT, VIA A DATABASE

312 — TRAIN A FRAUD RISK MODEL, BASED ON THE DATABASE

300

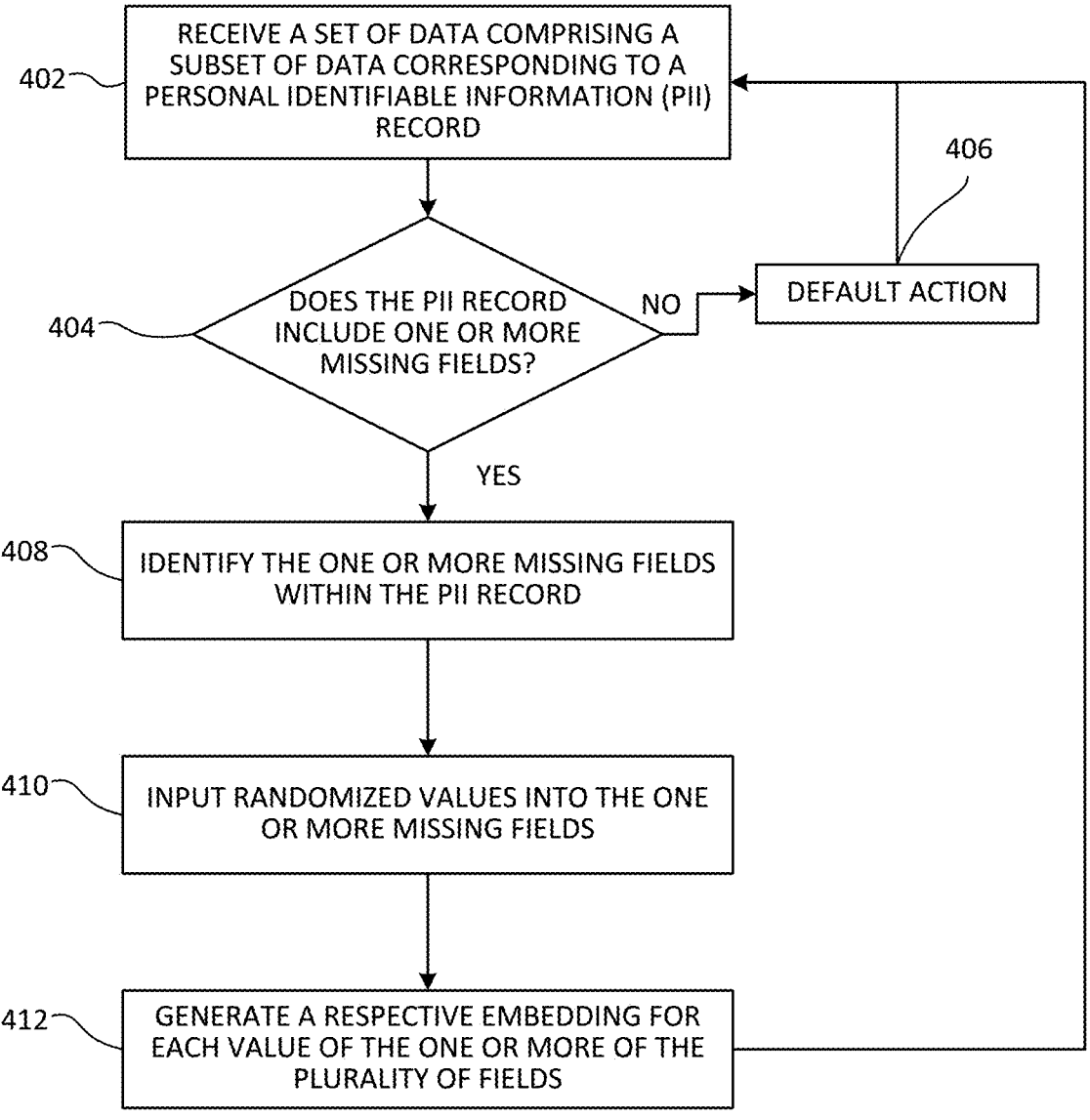

402 — RECEIVE A SET OF DATA COMPRISING A SUBSET OF DATA CORRESPONDING TO A PERSONAL IDENTIFIABLE INFORMATION (PII) RECORD

404 — DOES THE PII RECORD INCLUDE ONE OR MORE MISSING FIELDS?

NO

406 — DEFAULT ACTION

YES

408 — IDENTIFY THE ONE OR MORE MISSING FIELDS WITHIN THE PII RECORD

410 — INPUT RANDOMIZED VALUES INTO THE ONE OR MORE MISSING FIELDS

412 — GENERATE A RESPECTIVE EMBEDDING FOR EACH VALUE OF THE ONE OR MORE OF THE PLURALITY OF FIELDS

ANONYMIZING PERSONAL INFORMATION FOR USE IN ASSESSING FRAUD RISK

CROSS REFERENCE TO RELATED APPLICATIONS

This application claims priority to U.S. Provisional Application No. 63/378,624, entitled "ANONYMIZING PERSONAL INFORMATION FOR USE IN ASSESSING FRAUD RISK," and filed on Oct. 6, 2022, which is incorporated by reference herein for all purposes in its entirety.

BACKGROUND

Digital or electronic identity verification mechanisms may be used in a variety of contexts. In some examples, e-commerce providers use digital or electronic identity verification mechanisms to comply with regulations, as well as to establish a trusted relationship with their customers.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for anonymizing personal information for use in assessing fraud risk.

Mechanisms described herein may be used to anonymize personal information, such as for use in assessing fraud risk. A set of data may be received that includes a first subset of data that corresponds to a unique identifier (UID), a second subset of data that corresponds to a timestamp, and a third subset of data that corresponds to a personal identifiable information (PII) record. The PI record may include a plurality of fields, one or more of which may include values. The set of data may be pre-processed to improve anonymization. For example, a missing field within the PII record may be identified and a random value may be inserted into the missing field. A respective embedding may be generated for each value of a respective field, of the plurality of fields, that includes a value. The pre-processed set of data may be anonymized, by generating a respective hash for each of the embeddings, to generate an anonymized set of data. The anonymized set of data may be formatted within a graph structure that includes a plurality of edges and nodes. The graph structure may be stored in a database, and a fraud risk model may be trained, based on the database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 4 illustrates an example method of pre-processing data.

DETAILED DESCRIPTION

Figure 1:
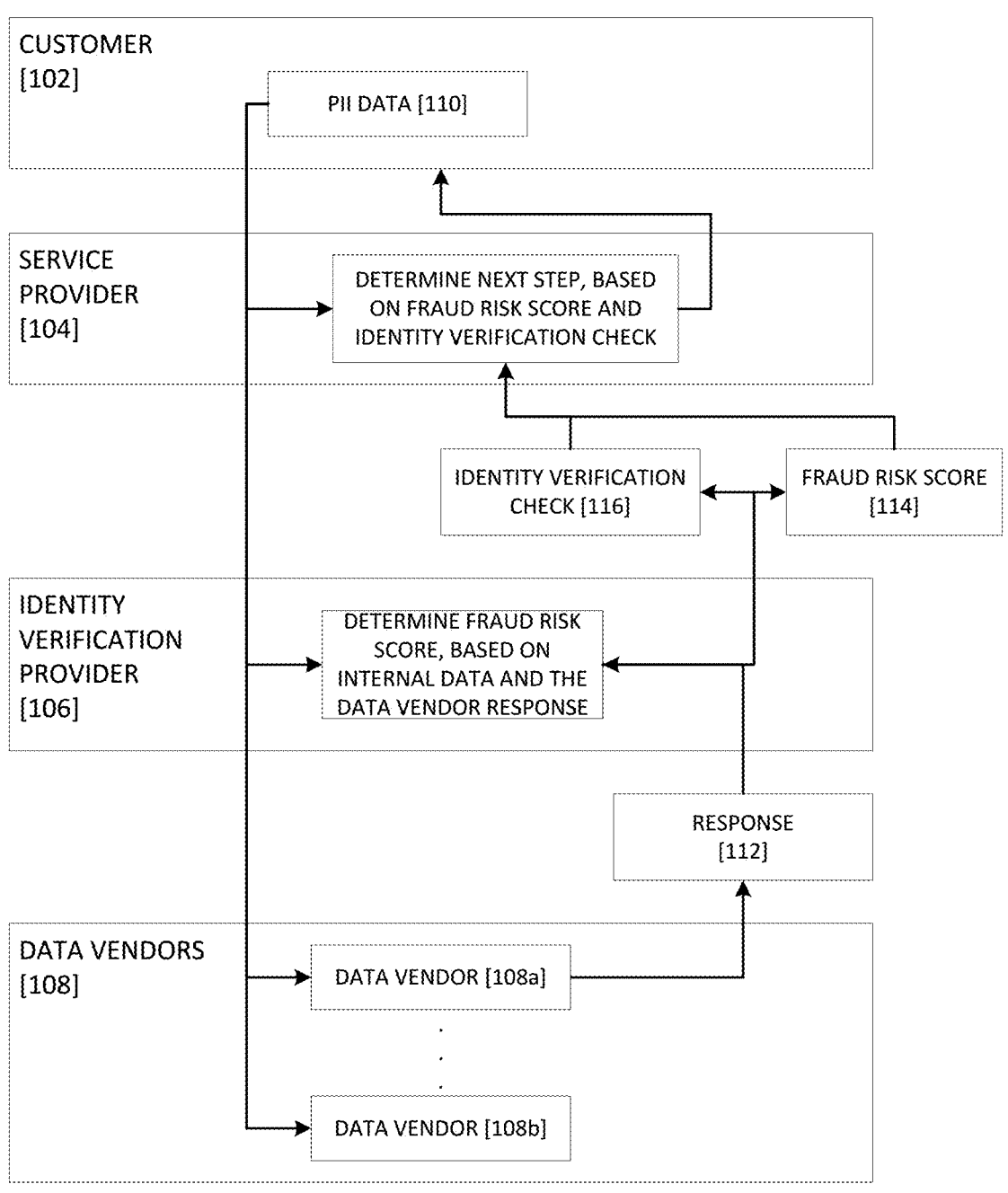
FIG. 1 illustrates an example flow of identity verification.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, digital or electronic identity verification mechanisms (e.g., methods, systems, and media) may be used in a variety of contexts. In some examples, e-commerce providers use digital or electronic identity verification mechanisms to comply with regulations, as well as to establish a trusted relationship with their customers.

Identity verification and fraud assessment necessitate, to some extent, the sharing and processing of personal identifiable information (PII) data, at least given constraints and industry accepted standards that are present at the time of preparing the present disclosure. Sharing, processing, and storing PII data inherently increase a risk of data breaches. As such, conventional mechanisms for identity verification and fraud risk assessment may, paradoxically, contribute to future identity fraud. Protecting a customer's privacy and reducing a proliferation of PII data, such as, for example, on the dark net, demand a fraud risk solution that keeps the processing of PII data (e.g., between a plurality of computing devices and/or servers) to a minimum and yet, at the same time, delivers reliable and accurate fraud risk assessments.

Advantages of mechanisms disclosed herein among providing other benefits, address the above deficiencies. For example, mechanisms disclosed herein provide techniques for anonymizing and/or encrypting data for data analysis, such as for data analysis related to determining a fraud risk. Further advantages may be apparent to those of ordinary skill in the art, at least in light of the non-limiting examples described herein.

Generally, identity fraud techniques analyze PII data to detect fraudulent patterns. The analysis of the PII data may include determining similarities between names, addresses, or other types of PII data in clear form. However, mechanisms disclosed herein do not analyze PII data directly; rather, mechanisms disclosed herein perform analysis on derived data that preserves privacy of the PII data. In other words, mechanisms disclosed herein provide the ability to detect fraudulent behaviors and patterns without the need to process PII data in clear form. Instead, PII data may be shared, stored, and/or processed in an anonymized form that eliminates a risk of exposing PII data (e.g., via data breaches), as well as protects and preserves a customer's privacy, while assessing fraud risks.

PII records that are received by systems disclosed herein may include a plurality of fields of personal information. For example, a PII record may contain a name, address, date of birth, government issued identification number like a social security number, email, phone number, biometrical data, as well as data like IP-addresses, browser information, behavioral data (e.g., copy and paste, or other keystroke input patterns), and input device data. Individual fields of a PII record are not necessarily considered PII data, independent of all of the fields in a record. For example, the knowledge of an address or specific behavior may not be sufficient to identify an individual, without additional PII data. Still any individual field or combination of fields in the PII record that is sufficient to identify an individual are considered PII data, as PII data is discussed herein.

The present disclosure provides mechanisms for to anonymize PII records that are received. The anonymized PII records are then stored and analyzed for fraud. The PII records themselves (i.e., data that has not been anonymized) are not stored or analyzed by some examples described herein, such that privacy of a user or customer is protected.

For some fields of PII records, preserving the similarity and relationship of a field instance to other field instances may be useful for subsequent fraud analysis and modeling. Such fields may be denoted as relational fields. For other fields, it may only be useful to maintain knowledge of if a field instance is unique. The two types of fields, relational and unique, are not mutually exclusive. A PII record field such as email, for example, may considered unique as well as relational to another field, in accordance with some examples provided herein. Additionally, or alternatively, in some examples, the two types of fields, relational and unique, may be mutually exclusive.

Some aspects of the present disclosure relate to methods, system, and media for anonymizing personal information for use in assessing fraud risk. For example, a set of data including a personal identifiable information (PII) record may be received. The PII record may include a plurality of fields that contain values. One or more fields within the PII record that are missing values may be populated with randomized values. An embedding may be generated for each value of the plurality of fields. Further, each embedding may be anonymized, by generating a respective hash, to generate an anonymized set of data that is stored in a database. In some examples, the anonymized set of data may be used to train a fraud risk model.

FIG. 1 illustrates an example flow 100 of digital identify verification. The example flow 100 includes a plurality of agents, such as a customer 102, a service provider 104, an identity verification provider 106, and/or one or more data vendors 108 (e.g., a first data vendor 108a and/or a second data vendor 108b). The plurality of agents 102, 104, 106, 108 may be one or more of a person, a hardware mechanism, a software mechanism, a machine learning model, and/or a combination thereof.

The customer 102 provides PII data (Personal Identifiable Information) 110. In some examples, the PII data 110 is captured, extracted, or otherwise received from the customer 102. The PII data 110 may include a name, address, date of birth, digitally captured copy of government issued identification card, digitally captured biometric data like a smartphone selfie. Additionally, or alternatively, the PII data 100 may include other auxiliary data, such as an IP-address, smartphone provided location, and/or gyroscope accelerometer data. The PII data 110 may be provided from the customer 102, to the service provider 104, through a user-interface. For example, the PII data 110 may be provided from the customer 102, to the service provider 104, through a web browser and/or a computing device (e.g., a laptop, smartphone, wearable device, virtual machine, etc.).

The service provider 104 transmits (e.g., passes) the PII data 110, or a subset of the PII data 110, to the identity verification provider 106, which in turn transmits (e.g., passes) the PII data 110 to the one or more data vendors 108. The one or more data vendors 108 then send a response 112 to the identity verification provider 106. The identity verification provider 106 analyzes the data vendor's 108 response 112, in conjunction with its own internal data to determine the veracity of the customer's 102 provided identity (e.g., identity verification check 116) as well as to assess a degree of risk (e.g., determine a fraud risk score 114). The fraud risk score 114 and the identity verification check 116 are then reported to the service provider 104. The service provider 104 determines next steps in the workflow, based on the fraud risk score 114 and the identity verification check 116.

The identity verification process 100, outlined above, shares or transmits the PII data 110 of a current customer identity in question (e.g., customer 102) with multiple parties to check the consistency and veracity of the provided PII data 110. To assess fraud risk additional processing of the PII data 110 may be performed, such as analyzing relationships of the currently processed PII data 110 against other PII data seen in the past by the identity verification provider 106 (e.g., historical PII data that is stored in memory and may be similar to the PII data 110). While aspects of FIG. 1 have been described as having certain actors perform certain actions, one of skill in the art will appreciate that aspects of the present disclosure may be performed using more of fewer actors or devices, in which cases the actions described herein may be consolidated to fewer devices or spread across a greater number of devices.

Figure 2:
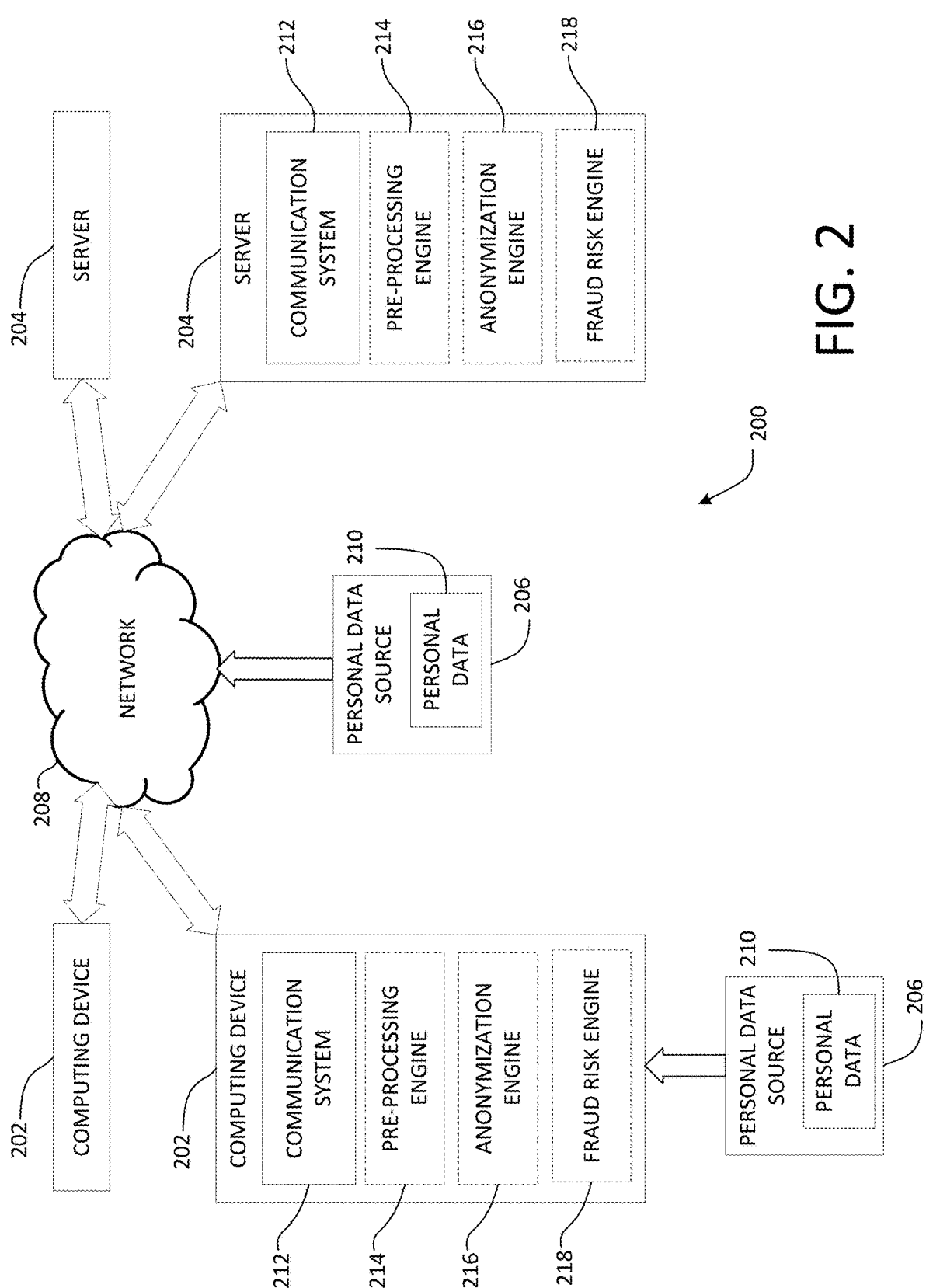
FIG. 2 illustrates an overview of an example system according to some aspects described herein.

FIG. 2 shows an example of a system 200, in accordance with some aspects of the disclosed subject matter. The system 200 may be a system for anonymizing personal information, such as for use in assessing fraud risk. The system 200 includes one or more computing devices 202, one or more servers 204, a personal data source 206, and a communication network or network 208. The computing device 202 can receive personal identifying information (PII) or personal data 210 from the personal data source 206, which may be, for example, a person that provides personal data, a service that aggregates or otherwise receives personal data, a computer-executed program that generates personal data, and/or memory with data stored therein corresponding to personal data. The personal data 210 may include a name, address, date of birth, digitally captured copy of government issued identification card, digitally captured biometric data like a smartphone selfie, or other types of identifiable information. Additionally, or alternatively, the personal data 210 may include other auxiliary data, such as an IP-address, smartphone provided location, and/or gyroscope accelerometer data. The personal data 210 may include additional and/or alternative types of personal data that may be recognized by those of ordinary skill in the art.

Additionally, or alternatively, the network 208 can receive personal data 210 from the personal data source 206, which may be, for example, a person that provides personal data, a service that aggregates or otherwise receives personal data, a computer-executed program that generates personal data, and/or memory with data stored therein corresponding to personal data. The personal data 210 may include a name, address, date of birth, digitally captured copy of government issued identification card, digitally captured biometric data like a smartphone selfie. Additionally, or alternatively, the personal data 210 may include other auxiliary data, such as an IP-address, smartphone provided location, and/or gyroscope accelerometer data. The personal data 210 may include additional and/or alternative types of personal data that may be recognized by those of ordinary skill in the art.

Computing device 202 may include a communication system 212, a pre-processing engine or component 214, an anonymization engine or component 216, and/or a fraud risk engine or component 218. In some examples, computing device 202 can execute at least a portion of the pre-processing component to identify one or more missing fields within a PII record that includes a plurality of fields including values, input randomized values into the missing fields (e.g., one or more fields that include no values or a default value), and generate a respective embedding for values of the one or more of the plurality of fields. Further, in some examples, computing device 202 can execute at least a portion of the anonymization component 216 to generate a hash for each embedding. The hash may be a locality sensitive hash (LSH) or a cryptographic hash, such as hash generated based on a 256-bit secure hash algorithm (SHA256). Further, in some examples, computing device 202 can execute at least a portion of the fraud risk component 218 to train a fraud risk model to calculate or otherwise determine a fraud risk score. The fraud risk model may be a machine-learning model.

Server 204 may include a communication system 212, a pre-processing engine or component 214, an anonymization engine or component 216, and/or a fraud risk engine or component 218. In some examples, server 204 can execute at least a portion of the pre-processing component to identify one or more missing fields within a PII record that includes a plurality of fields including values, input randomized values into the missing fields (e.g., one or more fields that include no values or a default value), and generate a respective embedding for each value of the one or more of the plurality of fields. Further, in some examples, server 204 can execute at least a portion of the anonymization component 216 to generate a hash for the embeddings. The hash may be a locality sensitive hash (LSH) or a cryptographic hash, such as is generated based on a 256-bit secure hash algorithm (SHA256). Further, in some examples, server 204 can execute at least a portion of the fraud risk component 218 to train a fraud risk model to calculate or otherwise determine a fraud risk score. The fraud risk model may be a machine-learning model.

Additionally, or alternatively, in some examples, computing device 202 can communicate data received from personal data source 206 to the server 204 over communication network 208, which can execute at least a portion of pre-processing component 214, anonymization component 216, and/or fraud risk component 218. In some examples, pre-processing component 214 may execute one or more portions of methods/processes 300 and/or 400 described below in connection with FIGS. 3 and 4, respectively. Further, in some examples, anonymization component 216 may execute one or more portions of methods/processes 300 and/or 400 described below in connection with FIGS. 3 and 4, respectively. Further, in some examples, fraud risk component 218 may execute one or more portions of methods/processes 300 and/or 400 described below in connection with FIGS. 3 and 4, respectively.

In some examples, computing device 202 and/or server 204 can be any suitable computing device or combination of devices that may be used by a requestor, such as a desktop computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 202 and/or a plurality of servers 204.

In some examples, personal data source 206 can be any suitable source of personal identifiable data (e.g., a name, address, date of birth, digitally captured copy of government issued identification card, digitally captured biometric data, IP-address, smartphone provided location, gyroscope accelerometer data, etc.). In a more particular example, personal data source 206 can include memory storing personal data (e.g., local memory of computing device 202, local memory of server 204, cloud storage, portable memory connected to computing device 202, portable memory connected to server 204, etc.).

In another more particular example, personal data source 206 can include an application configured to generate personal data. In some examples, personal data source 206 can be local to computing device 202. Additionally, or alternatively, personal data source 206 can be remote from computing device 202 and can communicate personal data 210 to computing device 202 (and/or server 204) via a communication network (e.g., communication network 208).

In some examples, communication network 208 can be any suitable communication network or combination of communication networks. For example, communication network 208 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 208 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 2 can each be any suitable communications link or combination of communication links, such as wired links, fiber optics links, Wi-Fi links, Bluetooth links, cellular links, etc.

Figure 3:
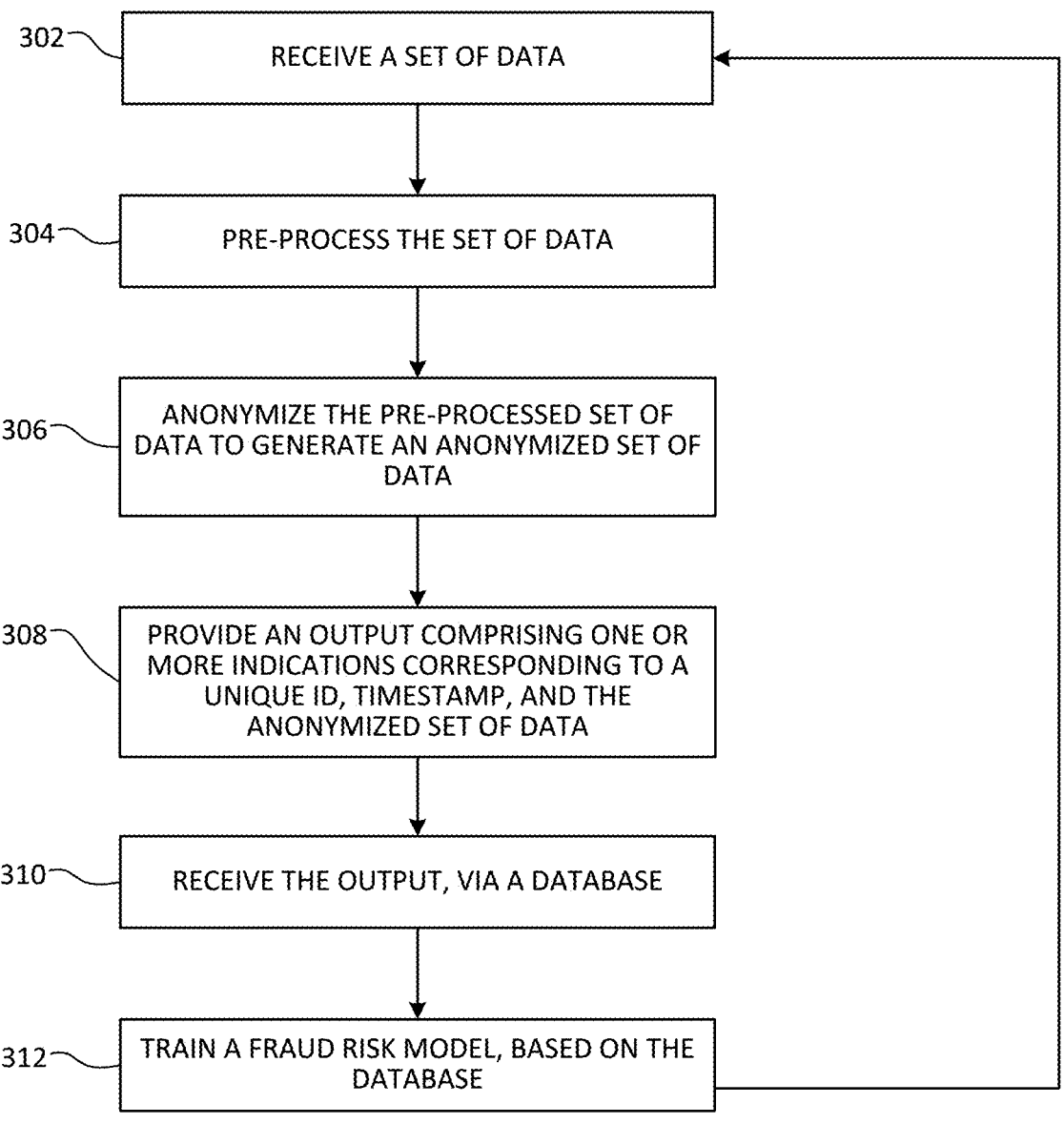
FIG. 3 illustrates an example method of anonymizing personal information.

FIG. 3 illustrates an example method 300 of anonymizing data, such as anonymizing personal information to train a fraud risk model. In examples, aspects of method 300 are performed by a device, such as computing device 202 and/or server 204, discussed above with respect to FIG. 2. It should be recognized that while method 300 recites operations in an exemplary order, operations disclosed herein may be performed in an alternative order and/or some operations may be performed in parallel. Further, in some examples, additional and/or fewer operations may be performed than those illustrated and described with respect to method 300. For example, operations 310 and 312 described herein may be optional, in some implementations of aspects described herein.

Method 300 begins at operation 302, wherein a set of data is received. The set of data may be received as a transaction from, for example, a customer. The set of data can include a plurality of subsets of data, such as a first subset of data that corresponds to a unique identifier (UID), a second subset of data that corresponds to a timestamp, and a third subset of data that corresponds to a personal identifiable information (PII) record. The UID can correspond to a specific PII record for which a fraud risk score may be calculated using mechanisms described herein. Further, the timestamp may correspond to a time at which the PII record and/or the UID is received by a device (e.g., computing device 202 and/or server 204 described earlier herein with respect to FIG. 2).

The PII record can include a plurality of fields. For example, the PII record can include a plurality of fields that correspond to one or more aspects of personal data, such as the personal data 210. In some examples, the first subset of data (e.g., corresponding to the UID) and the second subset of data (e.g., corresponding to the timestamp) may be fields in the PII record. The plurality of fields may correspond to one or more of a name, address, date of birth, government issued identification number, email, phone number, or biometrical data of an individual to whom a respective PII record corresponds. One or more of the plurality of fields can include values. The value may define one or more of the plurality of fields (e.g., the name, address, date of birth, government issued identification number, email, phone number, biometrical data, etc.) Each value of the one or more of the plurality of fields may be defined by a plurality of bytes (e.g., "1"s and/or "0"s). An exemplary PII record, that has been anonymized, is described in further detail with respect to FIG. 5.

At operation 304, the set of data is pre-processed. The pre-processing of the set of data may include cleaning and/or formatting the set of data. Additionally and/or alternatively, the pre-processing of the set of data may be based on randomization that may help to anonymize the set of data using further mechanisms described herein, by providing a degree of randomness. Additionally and/or alternatively the pre-processing may include identifying one or more missing fields within the PII record, inputting randomized values into the one or more missing fields, and generating a respective embedding for each value of the one or more of the plurality of fields. Such an example process of pre-processing is described in further detail with respect to FIG. 4.

At operation 306, the pre-processed set of data is anonymized to generate an anonymized set of data. The anonymizing may include generating a respective hash for each embedding. For example, if there are three embeddings, a first hash may be generated that corresponds to a first embedding of the three embeddings, a second hash may be generated that corresponds to a second embedding of the three embeddings, and a third hash may be generated that corresponds to a third embedding of the three embeddings.

The generated hashes may be generated using one or more of a plurality of techniques. For example, the hashes may be locality sensitive hashes (LSH). Additionally, or alternatively, the hashes may be cryptographic hashes. Additionally, or alternatively, the hashes may be generated based on a 256-bit secure hash algorithm (SHA256). Additional and/or alternative techniques for generating hashes may be recognized by those of ordinary skill in the art.

Generally, operations 304 and 306 provide degrees of both randomization and anonymization to protect a user's personal identifiable information. Such protections are valuable for complying with government privacy regulations, as well as to build trust with the users whose information is being protected.

At operation 308, an output is provided that includes one or more indications corresponding to a unique ID, a timestamp, and the anonymized set of data. The unique ID may be provided with the set of data received at operation 302. For example, the set of data may include a subset of data that corresponds to the unique ID. The unique ID may be assigned to a user, via an automated system, via manual input, or via any other techniques for assigned a unique ID for a given user. The timestamp may be a time at which the set of data is received. Additionally, or alternatively, the timestamp may be a time at which one or more subsets of the set of data are received (e.g., a first subset that corresponds to a unique ID, a second subset that corresponds to a PII record, etc.). The timestamp may include a day, month, year, time of day, duration of time since a baseline reference time, etc.

At operation 310, the output is received, via a database. It should be appreciated that the database stores an anonymized version of the set of the received set of data that may be altered by a degree of randomness (e.g., at operation 304), prior to be anonymized (e.g., at operation 306). Further, the database may store a plurality of PII records, such as historical data of PII records that have been gathered over a configurable period of time. In some examples, the received output may replace a previous iteration of an output (e.g., overwrite a memory location corresponding to the previous iteration). Alternatively, in some examples, the received output may be stored along with previous iterations of outputs (e.g., in a similar or related memory location as the previous iterations of outputs).

At operation 312, a fraud risk model is trained, based on the database. In some examples, the fraud risk model is a machine-learning (ML) model. The ML model may be a supervised machine-learning model that is trained based on the anonymized set of data (e.g., anonymized PII record). Training labels are derived from fraud information in the anonymized set of data. The fraud information itself may be obtained through any of a plurality of different methods. In some examples, the fraud information may be obtained through a manual review of records (e.g., by fraud analysts). Records without fraud information may be labeled as non-fraudulent or undetermined. Input feature vectors for the ML model may be a concatenation of LSH hashes in the PII record.

Feature vectors for cryptographically hashed fields, according to some examples described herein, are based on the number of occurrences of a given hash value in the database. The number of occurrences may be encoded using a one-hot encoding. The resulting feature vectors may be appended to the LSH-based feature vectors.

Furthermore, a final feature vector may be a binary vector that contains all of the field hashes in a given PII record (e.g., LSH and/or cryptographic hashes). The feature vectors are then used to train a supervised fraud risk model that outputs a fraud risk score. Example model architectures may include Support Vector Machines and/or Deep Neural Nets. A ML model that is trained in accordance with mechanisms described herein may be applied to new incoming PII records to determine a fraud risk score which is returned to a service provider (e.g., service provider 104 of FIG. 1).

In addition to the models described above that are based on the complete set of hashes in the PII record, individual models are trained based on a subset of hashes. For example, the input feature vector for email fraud risk model is solely based on the email LSH hash and the associated labels are derived from fraud information in the record pertaining to fraud involving emails. Other examples of individual fraud risk models include IP-address risk model, user input behavioral risk model, and input device risk model.

Commonly machine-learning based risk models are opaque to users. A set of input data is fed to the model, which then, in turn, outputs a score or probability. The risk model's reasoning or logic behind the mapping of the input data to either a high or low risk score may be difficult, if not impossible, for a user to retrace. A model's opaqueness is a particular challenge for fraud risk models where an end user may not be granted access to a service, based on a score that is difficult to explain. Individual risk models (e.g., email, IP-address, etc.) can provide granular insights into various risk factors, for fraud, as well as feedback to the end user and/or a fraud analyst to better understand underlying patterns that contribute to a low/high fraud risk assessment, thereby addressing common ML model opaqueness. To further improve clarity and understanding of ML models that are used in accordance with mechanisms described herein, mechanisms are provided to visualize fraud assessments, such as is shown and described, with respect to FIGS. 6A and 6B.

Method 300 may terminate at operation 312. Alternatively, method 300 may return to operation 302 (or any other operation from method 300) to provide an iterative loop, such as of receiving a set of data, pre-processing the set of data, anonymizing the pre-processed set of data to generate an anonymized set of data, and providing an output that includes one or more indications that correspond to a user ID, timestamp, and the anonymized set of data.

Generally, method 300 depicts a process to anonymize various fields in a PII record and store the information in a privacy preserving or anonymized record, within a database.

Missing fields in the PII record are filled with random strings. Then, all relational fields in the record (e.g., name, address, email, etc.) are embedded in a vector space. Mechanisms described herein may include n-gram representation and/or auto-encoder networks like a LSTM encoder-decoder network. Further, vector space embeddings may be hashed using a LSH hash (locality sensitive hashing).

FIG. 4 illustrates an example method 400 of pre-processing data, such as may be performed at operation 304 of method 300. In examples, aspects of method 400 are performed by a device, such as computing device 202 and/or server 204, discussed above with respect to FIG. 2.

Method 400 begins at operation 402, wherein a set of data is received. The set of data includes a subset of data that corresponds to a personal identifiable information (PII) record. Operation 402 may be similar to operation 302 discussed earlier herein with respect to FIG. 3.

At operation 404, it is determined whether the PII record includes one or more missing fields. For example, if a PII record is populated via user-input, then one or more fields may be missing (e.g., a value may not be present, or a default value may be present). Additionally, or alternatively, if a system is configured to generate the PII record, then one or more fields may be missing, such as in examples where appropriate values for one or more fields are not stored in a memory location that is accessible via the system, and/or appropriate values for the one or more fields cannot be otherwise obtained, thereby causing one or more fields to be missing in a PII record.

If it is determined that the PII record does not include one or more missing fields, flow branches "NO" to operation 406, where a default action is performed. For example, the received set of data may have an associated pre-configured action. In other examples, method 400 may comprise determining whether the received set of data has an associated default action, such that, in some instances, no action may be performed as a result of the received set of data. Method 400 may terminate at operation 406. Alternatively, method 400 may return to operation 402 to provide an iterative loop of receiving a set of data comprising a subset of data that corresponds to a PII record and determining if the PII record includes one or more missing fields.

If however, it is determined that the PII record does include one or more missing fields, flow instead branches "YES" to operation 408, where the one or more missing fields within the PII record are identified. For example, the one or more missing fields may be identified to correspond to one of a name, address, date of birth, government issued identification number, email, phone number, biometrical data, etc.

At operation 410, randomized values are input into the one or more missing fields. The randomized values may be a plurality of bytes that are randomly and/or pseudo-randomly generated to define a respective randomized value to each of the one or more missing fields. It should be appreciated that inputting randomized values into the one or more missing fields helps to increase privacy for a user's data, as described throughout the present disclosure.

At operation 412, a respective embedding is generated for each value of the one or more of the plurality of fields. In other words, for each field of the PII record (e.g., name, address, date of birth, etc.), a respective embedding may be generated. Additionally, or alternatively, in some examples, an embedding may be generated for a grouping or plurality of fields that are determined to be related.

Method 400 may terminate at operation 412. Alternatively, method 400 may return to operation 402 (or any other operation from method 400) to provide an iterative loop, such as of receiving a set of data that includes a subset of data corresponding to a PII record, inputting randomized values into missing fields of the PII record, and generating an embedding for values in each of a plurality of fields of the PII record.

Figure 5:
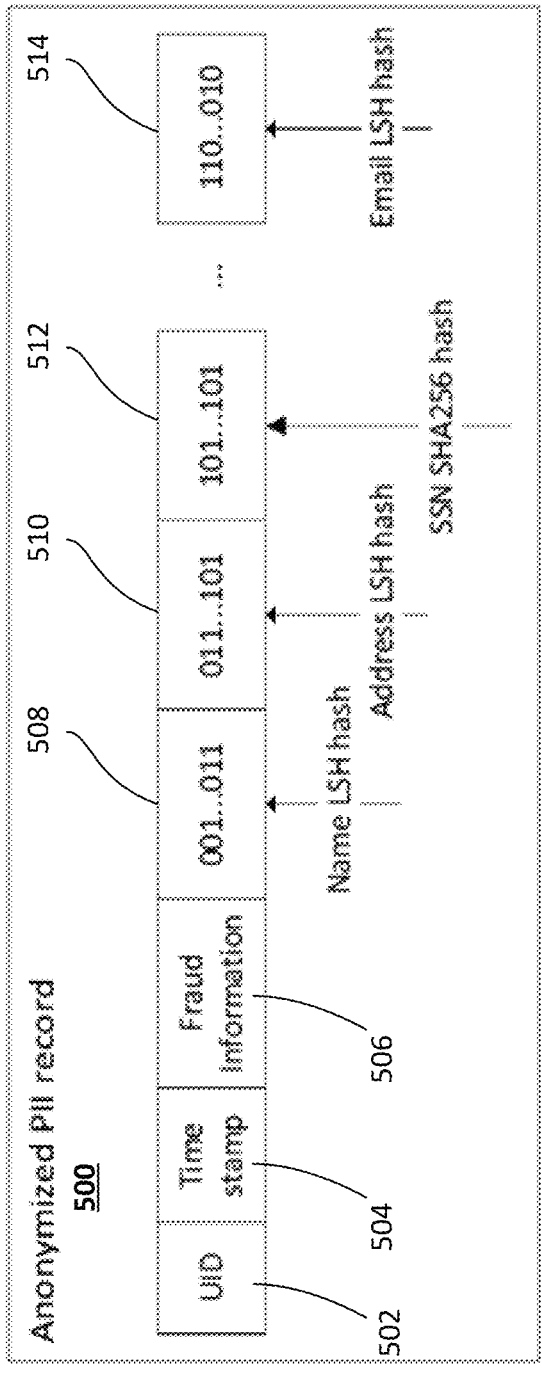
FIG. 5 illustrates an example of a privacy preserving personal identifiable information (PII) record, according to some aspects described herein.

FIG. 5 illustrates an example of a privacy preserving or anonymized personal identifiable information (PII) record 500, according to some aspects described herein. The anonymized PII record 500 preserves the privacy of an original PII record (e.g., a PII record that is part of received data, as described with respect to FIGS. 1-4). Therefore, the anonymized PII record 500 may be similar to the anonymized set of data described with respect to method 300. The anonymized PII record 500 includes a plurality of fields, such as a first field 502, a second field 504, a third field 506, a fourth field 508, a fifth field 510, a sixth field 512, and a seventh field 514. Each of the plurality of fields 502, 504, 506, 508, 510, 512, and 514 may contain a plurality of bytes that define values.

Each of the plurality of fields 502, 504, 506, 508, 510, 512, and 514 may be a respective one of the fields described earlier herein with respect to, for example, personal data 210. For example, the plurality of fields may each corresponds to a respective one of a name, address, date of birth, government issued identification number, email, phone number, or biometrical data.

Unique fields in a PII record are assumed to be resilient to frequency analysis, and thus they are anonymized, via cryptographic hashing, after appending a salt (e.g., randomized bits, such as "1"s, "0"s, or combinations thereof). An example of a cryptographic hash used in the presented invention is a SHA256 hash. As the bits that comprise a cryptographic hash representation are not expected to have any discernible correlation, a benefit of cryptographic hashing is to generate a unique identifier that is anonymized and suitable for subsequent machine-learning and analysis.

Collisions of non-identical inputs in a cryptographic hash are not expected to occur. This contrasts with LSH hash representation, where each bit may be expected to represent some shared feature of an originally observed string, and collisions within this space may be expected, and even desired, as both a means of preserving privacy, and as grouping together multiple distinct values that may share some indicator of fraud. To facilitate subsequent fraud analysis using, for example, supervised learning methods, as well as unsupervised learning methods, internally, as well as externally derived fraud information, may be obtained and stored together with an anonymized PII record in a database (e.g., the database described with respect to method 300).

In some alternative examples to the anonymized PII record 500, fields may be split and LSH hashes may calculated on subfields of the split fields, such as, for examples, a first name and a last name for the name field (e.g., the fourth field 508) or city and street address for the address field (e.g., the fifth field 510). Additional and/or alternative PII record examples include LSH and cryptographic hashes of field combination.

Theoretically, assuming an attacker has access to hash parameters (e.g., a set of randomly chosen projection hyperplanes) of various LSH hash functions (and has sufficient time, and compute power), a brute force attack may be conceivable. A successful brute force attack may yield many different variations of a given field instance that all hash to the same bucket. Such different variations may result in a plethora of field instance combinations, based on each of the LSH hashes in the PII record.

Each of the combinations, cracked by the attacker, may be a potential PII record. As such, the attacker may be confronted with the challenge of identifying an original record within a large number of possible records. The number of possible records grows exponentially with the number of fields in the record. In examples provided herein, hash parameters, including the bit length, are determined heuristically, from data samples, thereby ensuring that the number of PII records that map to the same anonymous PII record (e.g., anonymous PII record 500) are sufficiently large, to preserve privacy of individual PII records.

Furthermore, representing missing fields (e.g., one of the plurality of fields 502, 504, 506, 508, 510, 512, and 514) in the record 500 with random strings further strengthens the privacy preserving property of examples provided herein. Namely, the randomized strings increase a number of field combinations within a record, and thereby improves uniformity of collision rates over hash buckets. Such a benefit may be useful in preventing data privacy attacks, such as, for example, frequency analysis attacks.

Figure 6A:
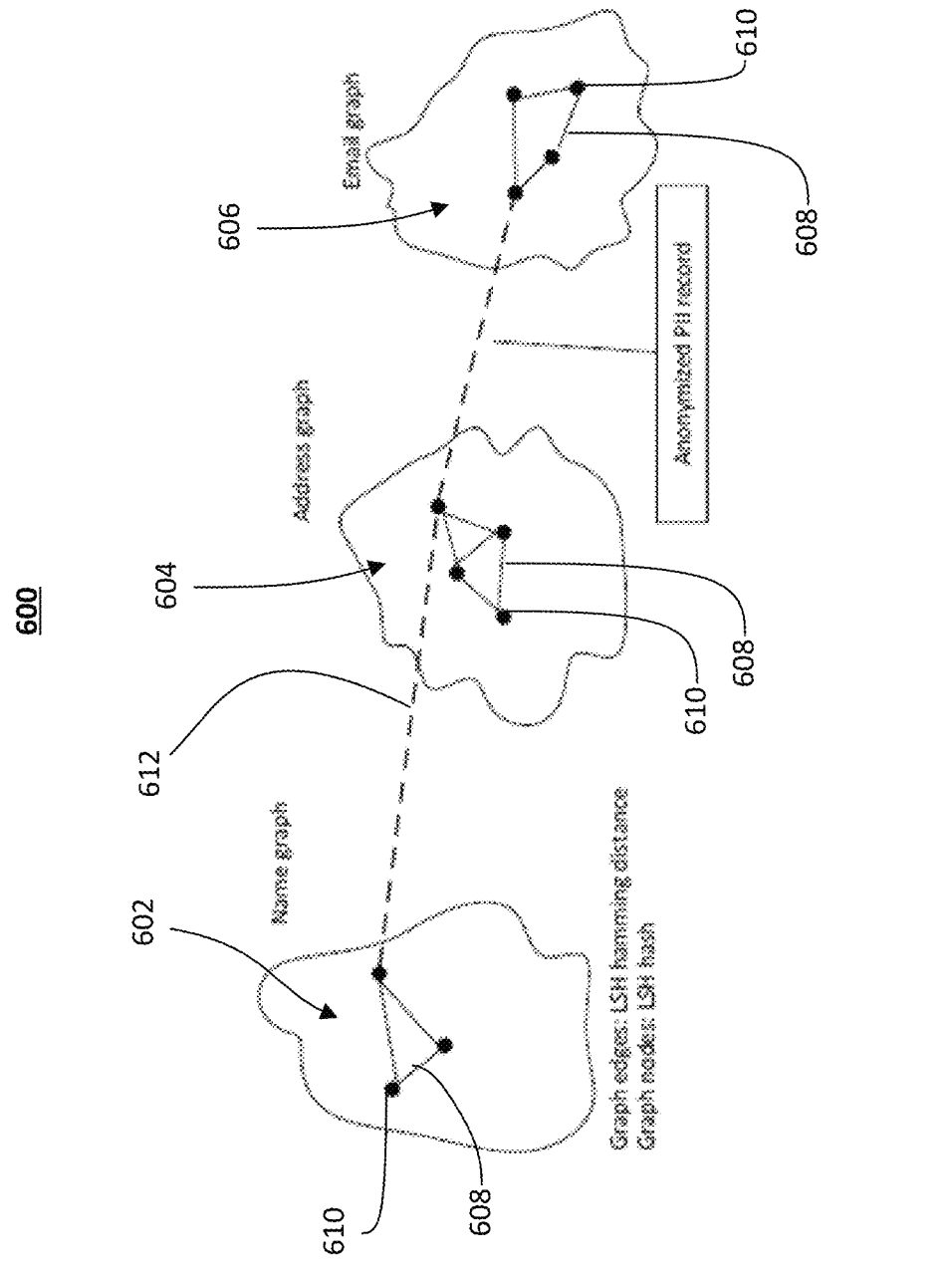
FIG. 6A illustrates an example graph visualization of an anonymized PII record and its relationship to other anonymized records, according to some aspects described herein.

FIG. 6A illustrates an example graph visualization 600 of an anonymized PII record and its relationship to other anonymized records, according to some aspects described herein. For a given field in an anonymized PII record (e.g., record 500), the LSH instances observed in the privacy preserving database form a graph, such as a first graph 602 for a name field, a second graph 604 for an address field, and a third graph 606 for an email field. Additional and/or alternative fields, for which graphs may be generated, may be recognized by those of ordinary skill in the art, at least in light of the teachings provided herein.

Each of the graphs 602, 604, 606 may include one or more edges 608 and one or more nodes 610. The edges 608 are given by a distance (e.g., a hamming distance) between hashes, and the nodes 610 represent specific hash instances. In the example visualization 600, a specific anonymous PII record is depicted as a specific path from a node from the name graph 602, to a node from the address graph 604, and to a node from the email graph 606 (e.g., as shown via a first dashed line 612).

Similar PII records share nodes (LSH hashes) resulting in a similar path through the graphs. In some examples, low dimensional embeddings of input feature vectors are determined. Further, a model representation of the input feature vectors, prior to a final output layer, can be utilized as embedding. Given an incoming record, a privacy preserving database (e.g., the database described with respect to method 300) can be searched to find records that are similar (e.g., as determined via a similarity metric, such as a Euclidean metric, cosine metric, etc.) to the record in question (e.g., the given incoming record). In some examples, one or more of the records in the privacy preserving database can be ranked, based on their similarity to the incoming record.

Figure 6B:
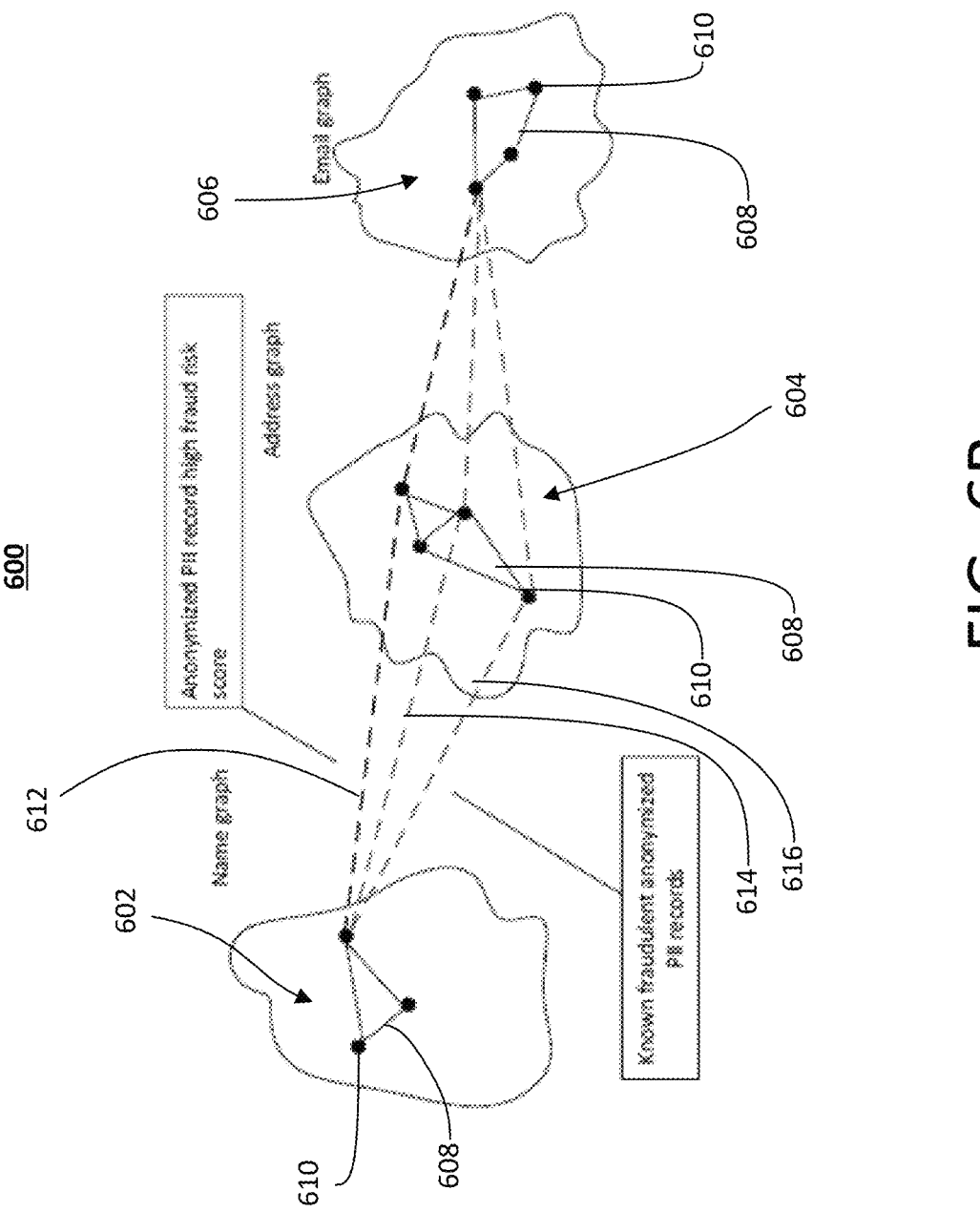
FIG. 6B illustrates an example graph visualization that includes fraud information on records, according to some aspects described herein.

FIG. 6B illustrates the example graph visualization 600, while further including fraud information on records, via a second dashed line 614 and a third dashed line 616. The first dashed line 612 corresponds to an anonymized PII record with a relatively high fraud risk score. The second dashed line 614 and the third dashed line 616 each correspond to respective anonymized records found in the privacy preserving database that are determined to have the highest similarity measure in comparison to the record in question. The anonymized records that are represented by the second dashed line 614 and the third dashed line 616 may be known to be fraudulent. In such examples, the similarity and/or dissimilarity of the fraudulent anonymized records to the record in question explains the high fraud risk score of the record in question (e.g., the record that is represented by the first dashed line 612). Namely, the fraud risk score may be calculated based on a degree of similarity (e.g., Euclidean similarity) of a record in question to records that are stored in a database and that are known to be fraudulent.

Figure 7:
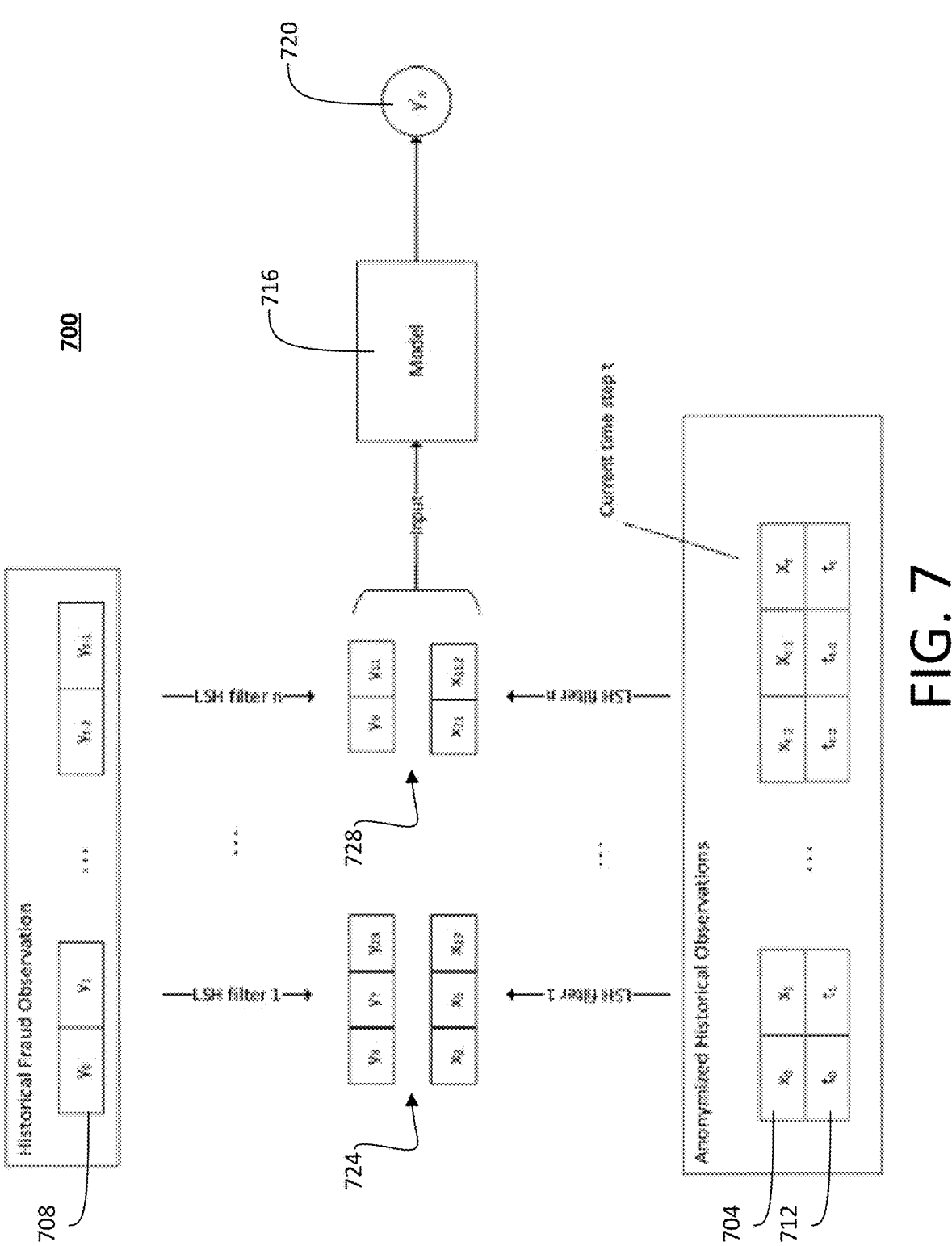
FIG. 7 illustrates an example machine-learning architecture that uses a stored history of PII records as time series input for both training and inference, according to some aspects described herein.

FIG. 7 illustrates an example machine-learning architecture 700 that uses a stored history of PII records as time series input for both training and inference, according to some aspects described herein. Generally, timestamps that correspond to anonymous PII records (e.g., anonymous PII record 500 of FIG. 5) may be used to form a timeseries of historical records.

The timeseries of historical records may be a source from which sequential representations of anonymized records 704 (denoted by [$x_0$–$x_t$]), fraud labels 708 (denoted by [$y_0$–$y_{t-1}$]), and timestamps 712 (denoted by [$t_0$–$t_t$]) are obtained or otherwise received. The sequences of anonymized records 704, fraud labels 708, and timestamps 712 may be used to train a machine-learning model 716 that infers a current fraud probability 720 ($y'_n$) from the series of anonymized records 704 (which may be represented as feature vectors), fraud labels 708, and timestamps 712. For example, the example machine-learning architecture 700 can take as input the history of a feature vector corresponding to anonymized records [$x_0$–$x_{t-1}$] and labels [$y_0$–$y_{t-1}$] observations in addition to the binary feature vector for a current observation ($x_t$), applied across all time steps in the training set. The example machine-learning architecture 700 may include Attention, Recurrent Neural Nets (LSTM), Convolution Nets, or any other type of machine-learning mechanism that may be recognized by those of ordinary skill in the art.

In some examples, where the time series can be comprised of a very large number of independent observations, a similarity-preserving property of LSH may be leveraged to filter entries of the series (e.g., records 704, fraud labels 708, and timestamps 712) to one or more condensed subsets, such as a first subset 724 and a second subset 728, containing only values similar to a hash value that correspond to the timestep of a predicted label, as illustrated by "LSH filter 1" and "LSH filter N" of FIG. 7.

An exemplary similarity metric that may be used as a criterion for filtering into the first subset 724 and/or the second subset 728 may be based on an exact LSH value match and a distance (e.g., Hamming distance) between two LSH values, or an LSH match on a subset of bits, such as those corresponding to a single field. Filtering entries of series (e.g., records 704, fraud labels 708, and timestamps 712) may greatly reduce computational and memory complexity of sequence modeling, without significantly affecting model performance. More than one filtering step may be used to select different subsets that may be relevant as model input. Additional and/or alternative filtering methods that may help to reduce computational and memory complexity may be recognized by those of ordinary skill in the art.

Figure 8:
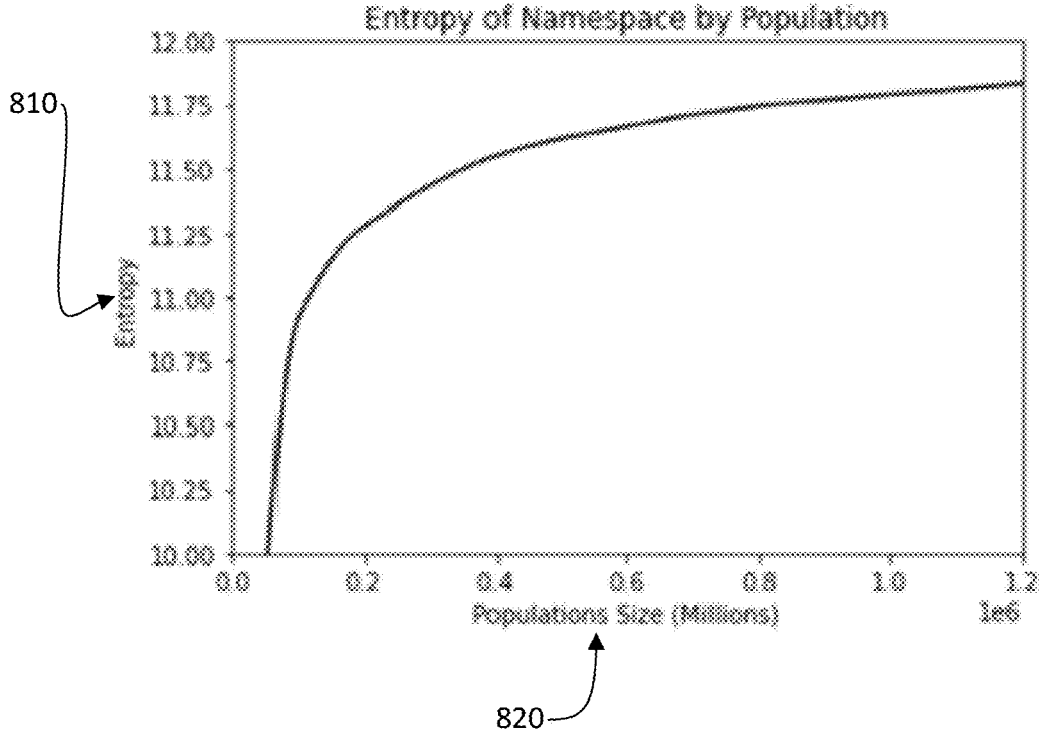
FIG. 8 illustrates an example entropy of name space, as a function of population size, according to some aspects described herein.
Figure 9:
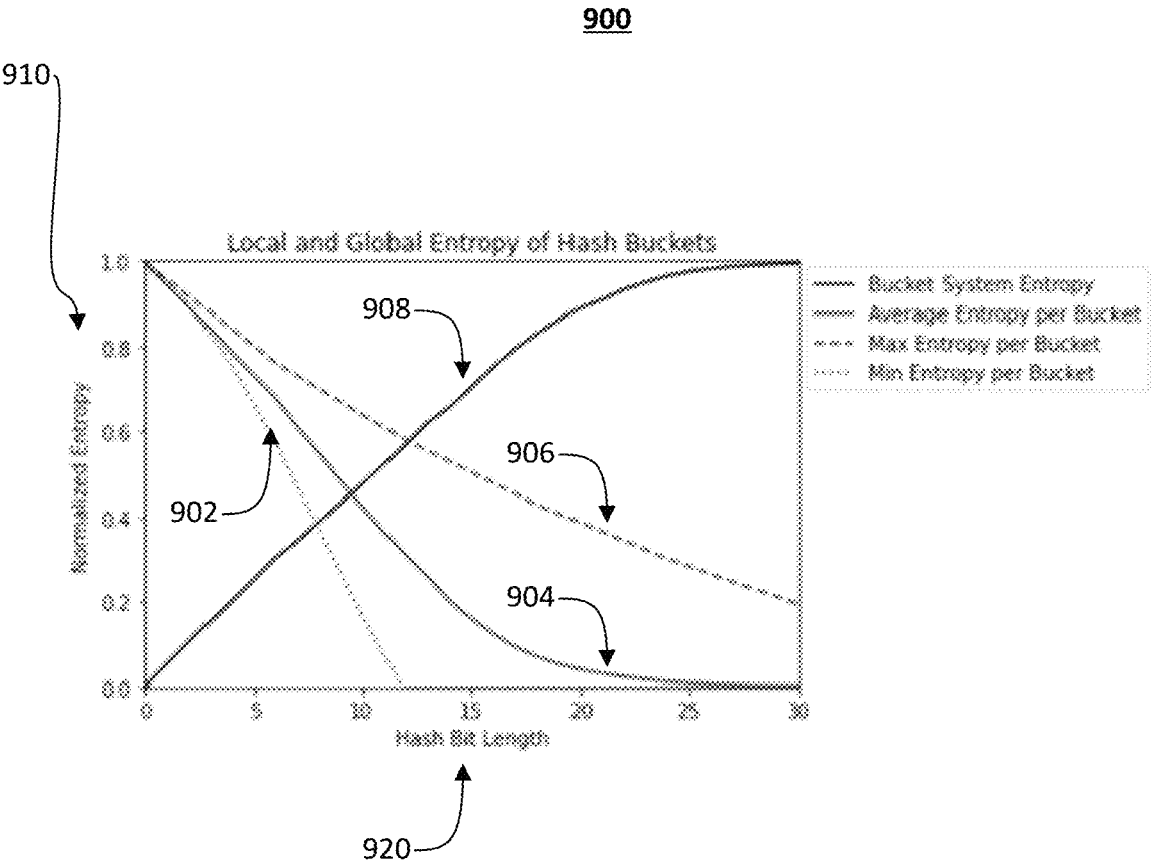
FIG. 9 illustrates tradeoff of global and local entropy (per hash bucket), as a function of hash length, according to some aspects described herein.

FIG. 8 illustrates an example graph 800 plotting entropy 810 of name space, as a function of population size 820, according to some aspects described herein. Further, FIG. 9 illustrates an example graph 900 plotting tradeoff of global (normalized to the size of the observed event space) and local entropy (per hash bucket), as a function of hash length, according to some aspects described herein:

One example of LSH hashes used in accordance with aspects described herein are random projection-based LSH hashes. The bit length of hashes may be selected or otherwise configured to ensure that hash buckets are fuzzy enough to sufficiently anonymize PII strings, while still containing enough information for subsequent fraud analysis. One metric to select an appropriate hash bit length may be based on an entropy within each hash bucket in conjunction with an entropy of an entire system of buckets.

Hash bucket entropy is a localized entropy to each individual hash, whereas a bucket system entropy is a global entropy of all hashes of length K. The local entropy of graph 900 is shown on via a first line 902, a second line 904, and a third line 906 of the example graph 900, whereas the global entropy (normalized to the size of the observed event space) is shown via a fourth line 908. The first line 902 corresponds to a minimum entropy per bucket. The second line 904 corresponds to an average entropy per bucket. The third line 906 corresponds to a maximum entropy per bucket. Further, the fourth line 908 corresponds to the bucket system entropy.

Generally, greater local entropy implies relatively more privacy because there is relatively more anonymity, through variations, within each individual hash bucket. Greater bucket system entropy implies relatively more information is retained from the original N-grams, for analysis. An upper bound for the bucket system entropy of some examples provided herein is the scenario in which a frequency of each hash bucket is uniformly distributed across an entire population. Consequently, a system may have a reasonable lower and upper bound for choosing a hash bit length K, shown by the intersections of the bucket system entropy (e.g., the fourth line 908) and min/max local entropies (e.g., the first line 902 and the third line 906), respectively. An optimal number of bits to have both sufficient privacy and information retained, may be the intersection between the bucket system entropy (e.g., the fourth line 908) and the average local entropy (e.g., the second line 904), which for the example of graph 900 is approximately k=10. The optimal intersection will shift with respect to population size as the entropy of the entire namespace increases, as shown via the graph 800.

Figure 10:
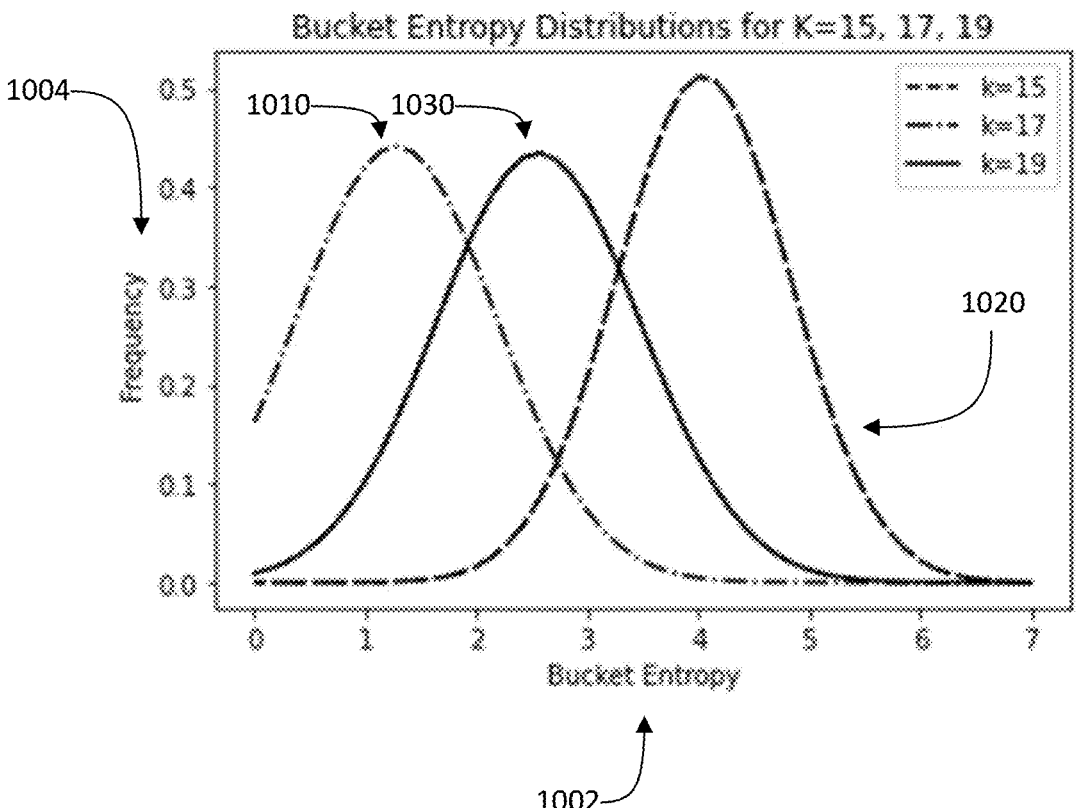
FIG. 10 illustrates an example graph plotting a distribution of entropy per bucket for bit lengths of 15, 17, and 19, according to some aspects described herein.

FIG. 10 illustrates an example graph 1000 plotting a distribution of entropy per bucket for bit lengths ("K") of 15, 17, and 19, according to some aspects described herein. The graph 1000 includes an x-axis 1002 and a y-axis 1004. The x-axis 1002 of the graph 1000 corresponds to bucket entropy, and the y-axis 1004 of the graph 1000 corresponds to frequency. The example graph 1000 includes a first line 1010 that corresponds to a bit length of 15, a second line 1020 that corresponds to a bit length of 17, and a third line 1030 that corresponds to a bit length of 19. The first line 1010 has a maximum frequency at a bucket entropy of about 1. The frequency of the first line 1010 decreases at bucket entropy values of greater than and less than about 1. The second line 1020 has a maximum frequency at a bucket entropy of about 4. The frequency of the second line 1020 decreases at bucket entropy values of greater than and less than about 4. The third line 1030 has a maximum frequency at a bucket entropy value of between about 2 and 3 (inclusive). The frequency of the third line 1030 decreases at bucket entropy values of greater than and less than the range of bucket entropy values between about 2 and 3.

Figure 11:
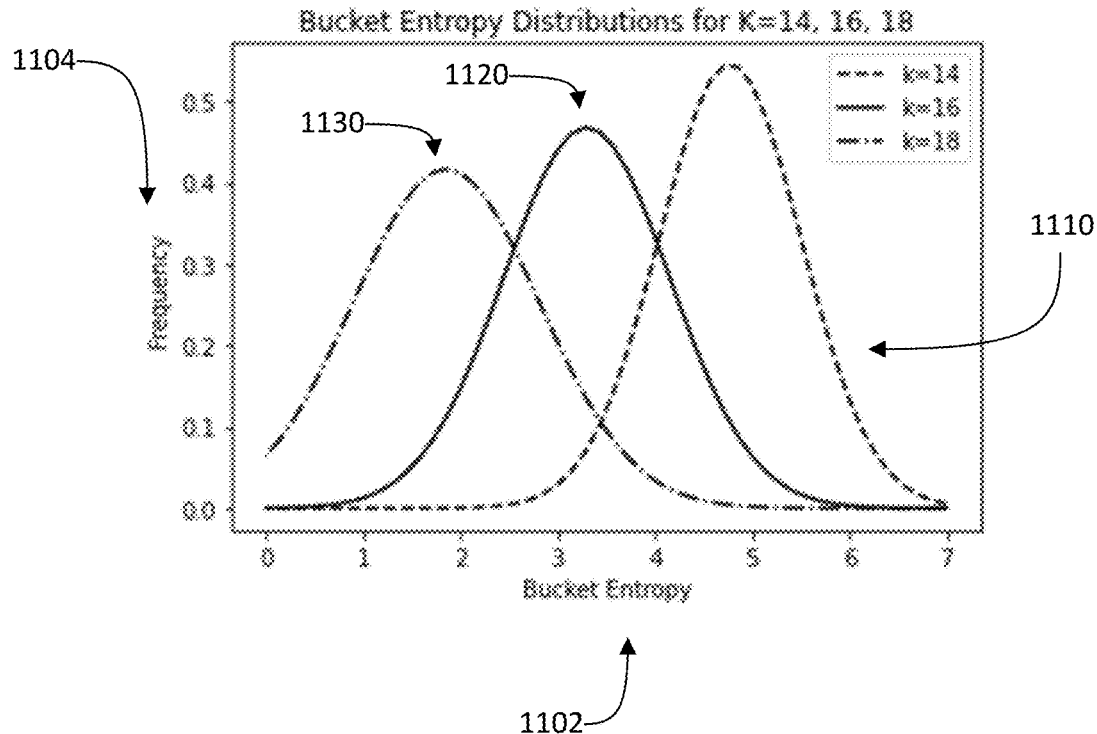
FIG. 11 illustrates an example graph plotting a distribution of entropy per bucket for bit lengths of 14, 16, and 18, according to some aspects described herein.

FIG. 11 illustrates an example graph 1100 plotting a distribution of entropy per bucket for bit lengths ("K") of 14, 16, and 18, according to some aspects described herein. The graph 1100 includes an x-axis 1102 and a y-axis 1104. The x-axis 1102 of the graph 1100 corresponds to bucket entropy, and the y-axis 1104 of the graph 1100 corresponds to frequency. The example graph 1100 includes a first line 1110 that corresponds to a bit length of 14, a second line 1120 that corresponds to a bit length of 16, and a third line 1130 that corresponds to a bit length of 18. The first line 1110 has a maximum frequency at a bucket entropy of about 5. The frequency of the first line 1110 decreases at bucket entropy values of greater than and less than about 5. The second line 1120 has a maximum frequency at a bucket entropy value of between about 3 and 4 (inclusive). The frequency of the second line 1120 decreases at bucket entropy values of greater than and less than the range of bucket entropy values of between about 3 and 4. The third line 1130 has a maximum frequency at a bucket entropy value of about 2. The frequency of the third line 1130 decreases at bucket entropy values of greater than and less than about 2.

Figure 12:
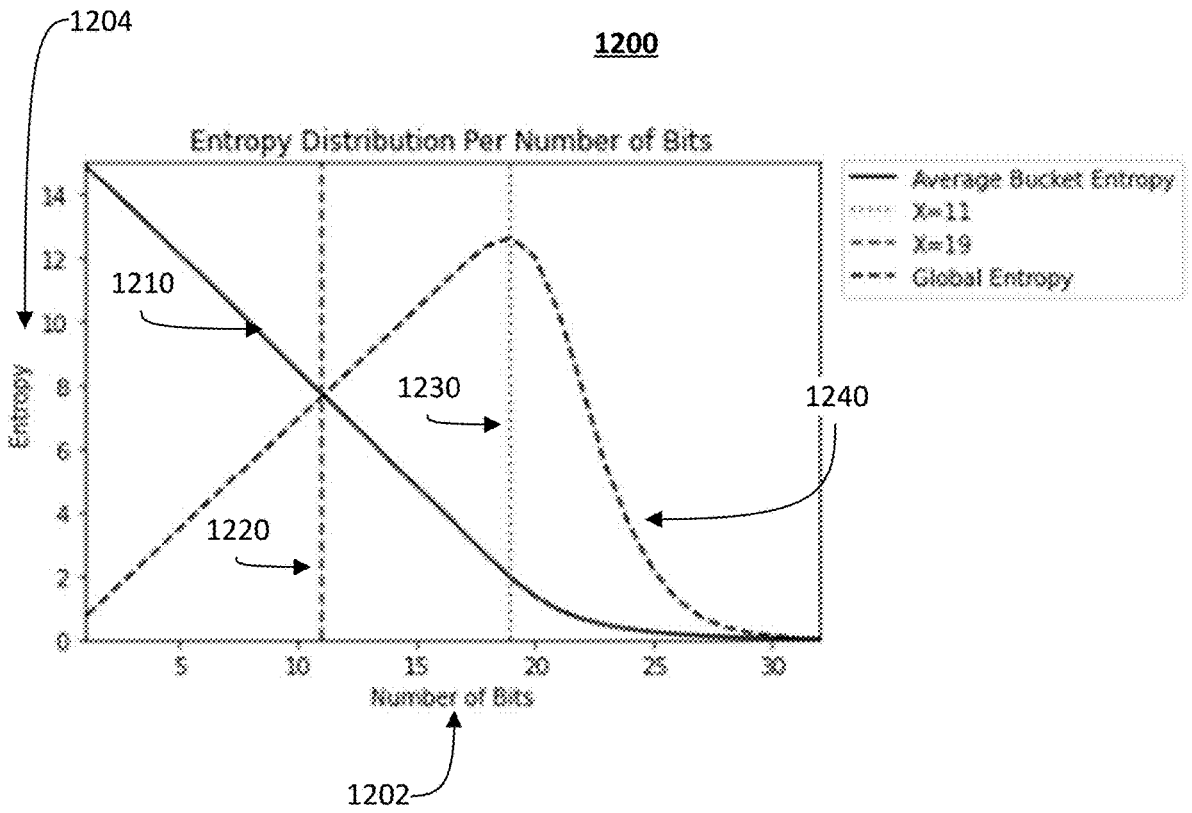
FIG. 12 illustrates an example graph plotting entropy distribution per number of bits, according to some aspects described herein.

FIG. 12 illustrates an example graph 1200 plotting entropy distribution per number of bits, according to some aspects described herein. The graph 1200 includes an x-axis 1202 and a y-axis 1204. The x-axis 1202 of the graph 1200 corresponds to entropy and the y-axis 1204 of the graph 1200 corresponds to number of bits. The example graph 1200 includes a first line 1210 that corresponds to an average bucket entropy, a second line 1220 that corresponds to 11 bits, a third line 1230 that corresponds to 19 bits, and a fourth line 1240 that corresponds to a global entropy (normalized to the size of the theoretically available event space).

The example graph 1200 describes the average entropy per hash bucket (e.g., via the first line 1210) and the global entropy of the whole system (e.g., via the fourth line 1240). The entropy per hash bucket illustrated by the first line 1210 is an average derived from the frequency of values within each hash bucket. The global entropy illustrated by the fourth line 1240 refers to the frequency of hash buckets over a whole system. In some examples, the average entropies observed for each hash bucket are relative to 32 bit hashes, implying that the observed entropies are a reasonable lower bound.

In some examples, the entropy per hash bucket decreases as the number of bits increases (e.g., from zero to thirty, along the x-axis 1202) as there are less collisions for a given bucket. In some examples, there is a greater state of randomness with lower bit counts and thus more anonymity. The average entropy per hash bucket (e.g., illustrated by the first line 1210) decreases linearly up until 19 bits where the first empty bucket is seen. The global entropy (e.g., illustrated by the fourth line 1240) increases with the number of bits, as the number of unique hashes increases, resulting in more variation. In some examples, the global entropy falls at around 19 bits due to the same presence of empty buckets. The intersection of the two entropies (e.g., at the intersection of the first line 1210 and the fourth line 1240) acts as the maximal combination of the two entropies, and serves as a good lower limit for a bit count with maximal anonymity. In some examples, the global entropy peaks at 19 bits. In such examples, such as the examples illustrates in graph 1200, 19 bits is the maximal amount of information retained for analysis, while still preserving anonymity and thus serves as an upper limit for the bit length.

The example graph 1200 is based on a "Names" field of a PII record, such as the anonymized PII record 500 discussed with respect to FIG. 5. It should be recognized by those of ordinary skill in the art that different fields (e.g., email, address, SSN, etc.) may have its own optimal bit number, depending on, for example, an underlying event space and probability distribution.

Figure 13:
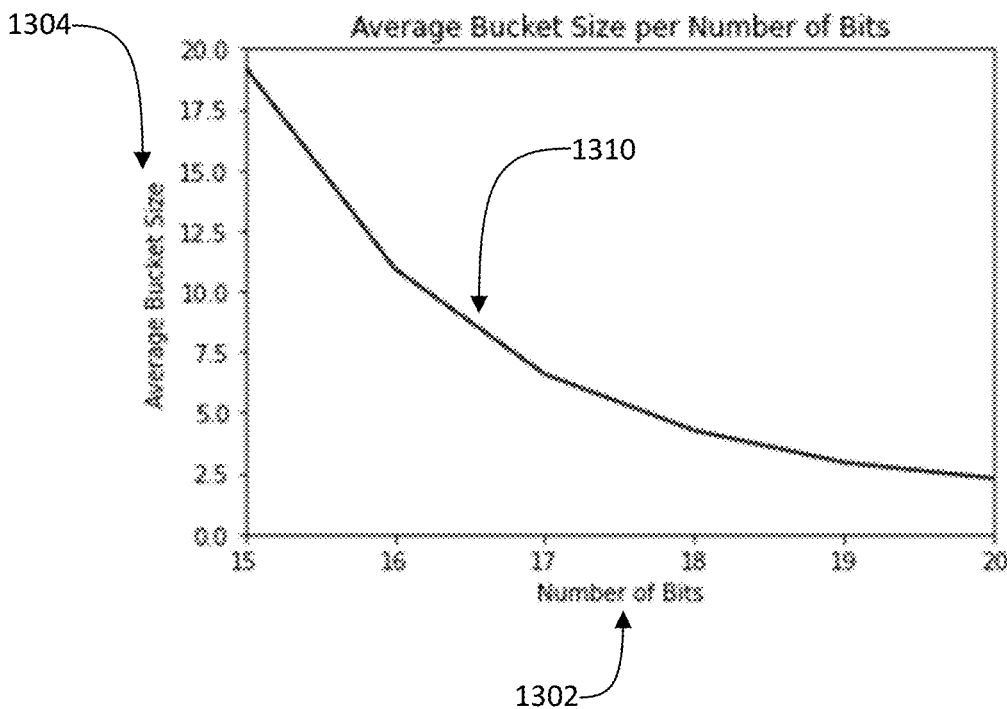
FIG. 13 illustrate an example graph plotting an average bucket size per number of bits, according to some aspects described herein.

FIG. 13 illustrate an example graph 1300 plotting average bucket size per number of bits, according to some aspects described herein. The average bucket size is a number of unique values per bucket. The example graph 1300 includes an x-axis 1302 and a y-axis 1304. The x-axis 1302 corresponds to a number of bits. For example, in the graph 1300, the number of bits include bit lengths of 15, 16, 17, 18, 19, and 20. The y-axis 1304 corresponds to an average bucket size for each of the number of bits. The example graph 1300 further includes a line 1310 that illustrates the relationship between the each of the number of bits of the x-axis 1302 and each of the average bucket sizes of the y-axis 1304. Generally, the average bucket size decreases as the number of bits increases. For example, when the number of bits is 15, the average bucket size is about 19, while when the number of bits is 17, the average bucket size is about 6. Additional and/or alternative relationships between a number of bits and a corresponding average bucket size may be recognized by those of ordinary skill in the art, at least in view of the example graph 1300.

Figure 14:
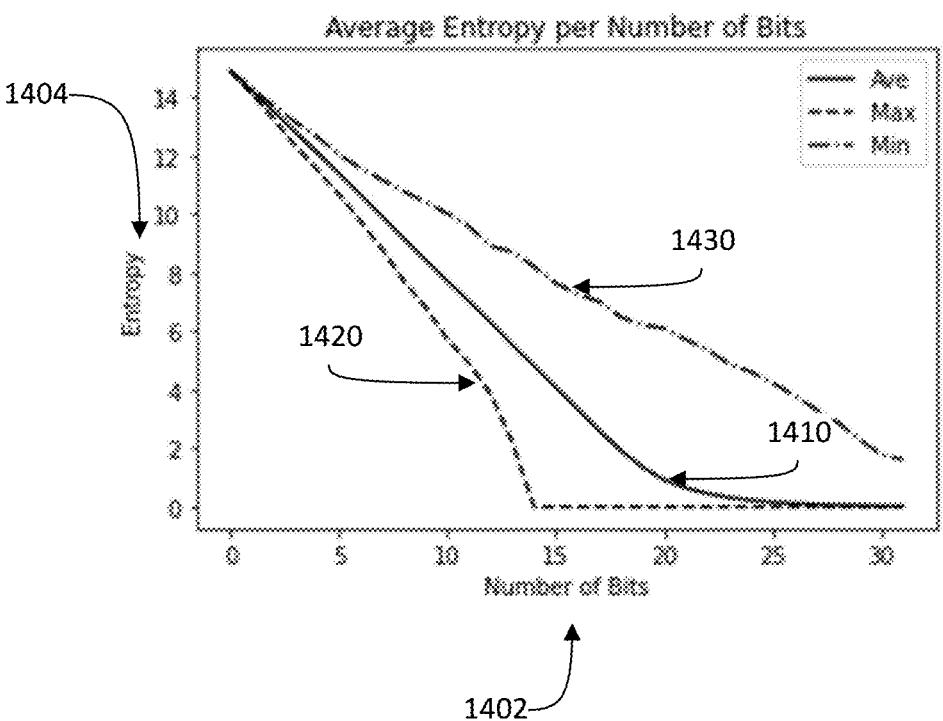
FIG. 14 illustrates an example graph plotting an average entropy per number of bits, according to some aspects described herein.

FIG. 14 illustrates an example graph 1400 plotting an average entropy per number of bits, according to some aspects described herein. The example graph 1400 includes an x-axis 1402 and a y-axis 1404. The x-axis 1402 corresponds to a number of bits, and the y-axis 1404 corresponds to an amount of entropy. The graph 1400 further includes a first line 1410, a second line 1420, and a third line 1430. The first line 1410 corresponds to an average entropy, for a given number of bits. The second line 1420 corresponds to a maximum entropy, for a given number of bits. The third line 1430 corresponds to a minimum entropy, for a given number of bits. The minimum entropy (e.g., represented by the third line 1430) decreases from an entropy of about 14 (at zero bits) to an entropy of zero (at about 15 bits). The maximum entropy (e.g., represented by the second line 1420) decreases from an entropy of about 14 (at zero bits) to an entropy of about 2 (at about 30 bits). The average entropy (e.g., represented by the first line 1410) decreases from an entropy of about 14 (at zero bits) to an entropy of about zero (at about 25 bits). Additional and/or alternative relationships between entropy and a number of bits may be recognized by those of ordinary skill in the art, at least in view of the example graph 1400.

Figure 15:
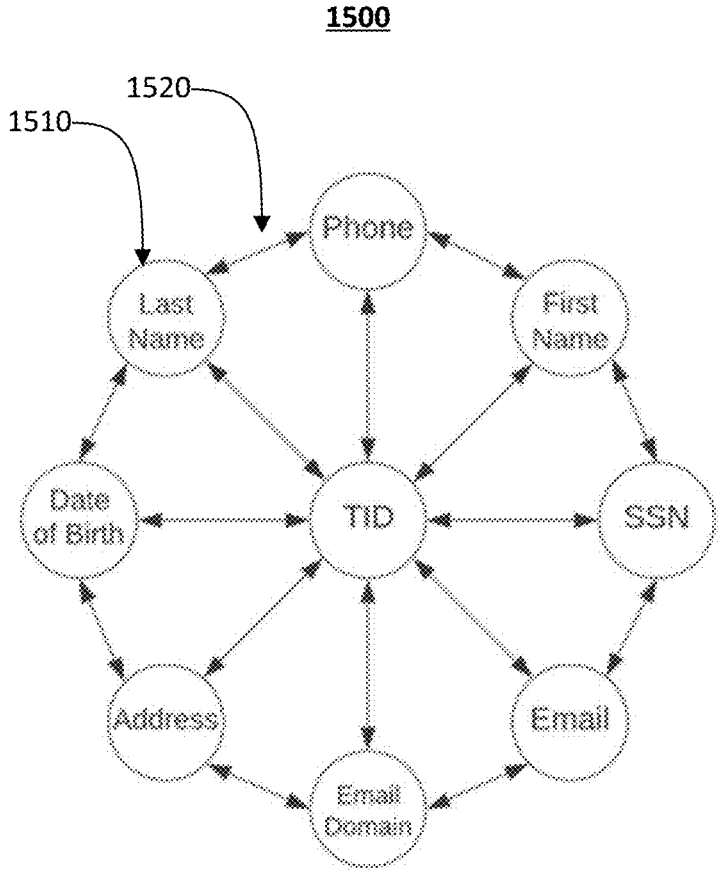
FIG. 15 illustrates an example graph structure of one full transaction, according to some aspects described herein.

FIG. 15 illustrates an example graph structure 1500 of one full transaction, according to some aspects described herein. The graph structure 1500 includes a plurality of nodes 1510 and a plurality of edges 1520. The plurality of nodes 1510 may correspond to one from the group of: a phone number, a first name, a social security number (SSN), an email address, an email domain, an address, a date of birth, a last name, an address, an employee identifier, and a transaction ID (TID), as examples. In some examples, the plurality of nodes 1510 may each correspond to anonymized representations of data (e.g., data that has been anonymized by operation 306 of method 300, described earlier herein with respect to FIG. 3). For example, the anonymized set of data of method 300 may include a plurality of anonymized fields that each correspond to a respective field of the plurality of fields (e.g., name, email, date of birth, etc.).

After PII data is hashed from either LSH hashes or cryptographic hashes, the hashes may be input into a relational database, such as, for example, a graph structured database. Fields such as name, transaction ID (TID), national ID number, etc. may be added as one or more of the plurality of nodes 1510 into the graph 1500. One should recognize that in some examples the TID of FIG. 15, which is a central node of a transaction exemplified by the graph structure 1500, is similar to the unique identifier (UID) discussed earlier herein. From the plurality of edges 1520, a respective edge may be added between all fields within a transaction (e.g., as shown in FIG. 15). In some examples, duplicate nodes are not added. For example, if a node already exists in a graph, more edges (e.g., of the plurality of edges 1520) are added that connect the existing node (e.g., from the plurality of nodes 1510) to the new transaction and all of its fields. Accordingly, the graph structure 1500 may be useful for scaling mechanisms described herein without requiring a relatively large increase in computational researches (e.g., memory for storing or processing power for searching within a memory location).

Figure 16:
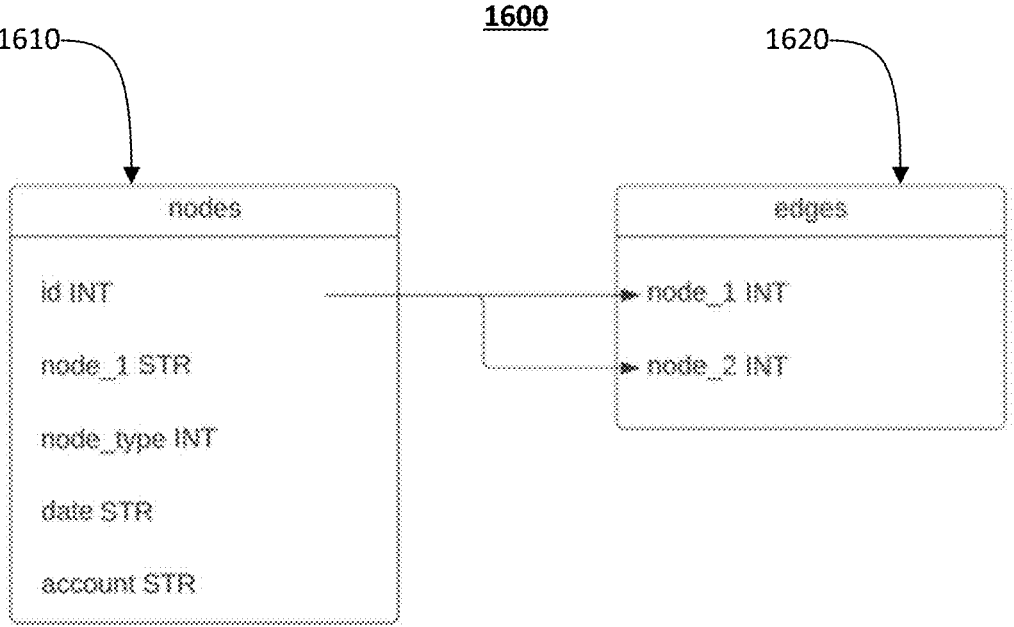
FIG. 16 illustrates an example data store layout, according to some aspects described herein.

FIG. 16 illustrates an example data store layout 1600, according to some aspects described herein. The data store layout 1600 may be a relational database or database. The relational database 1600 may be made up of a first table 1610 and a second table 1620. The first table 1610 may be a node table, and the second table 1620 may be an edge table. The node table 1610 contains hashes corresponding to one or more nodes (e.g., the plurality of nodes 1510) with their respective index. For each transaction ID, any meta data associated with the transaction such as account, timestamp etc. may also be stored. The edge table 1620 contains indications corresponding to one or more edges (e.g., from the plurality of edges 1520).

As described herein, an edge may be tuple indices of two nodes that are associated together. All pairs of fields within a transaction may be added to the edge table 1620. Every edge may be added twice, that is, for two fields A and B in the same transaction. For example, edge (A, B) may be added, as well as edge (B, A). This allows for drastically reduced search times within the edge table 1620. Further, in some examples, the edge table may be sorted based on nodes, thereby improving searchability of the edge table.

Mechanisms described herein further include neighborhoods with respect to nodes. The 1st-order neighborhood around any central node (e.g., of the plurality of nodes 1510), may include all nodes connected by an edge (e.g., of the plurality of edges 1520 and/or from the edge table 1620) to such node. The 1st-order neighborhood may include at least one full transaction. If the central node is a transaction ID, then the 1st-order neighborhood may be only one full transaction (e.g., as shown in FIG. 15).

Figure 17:
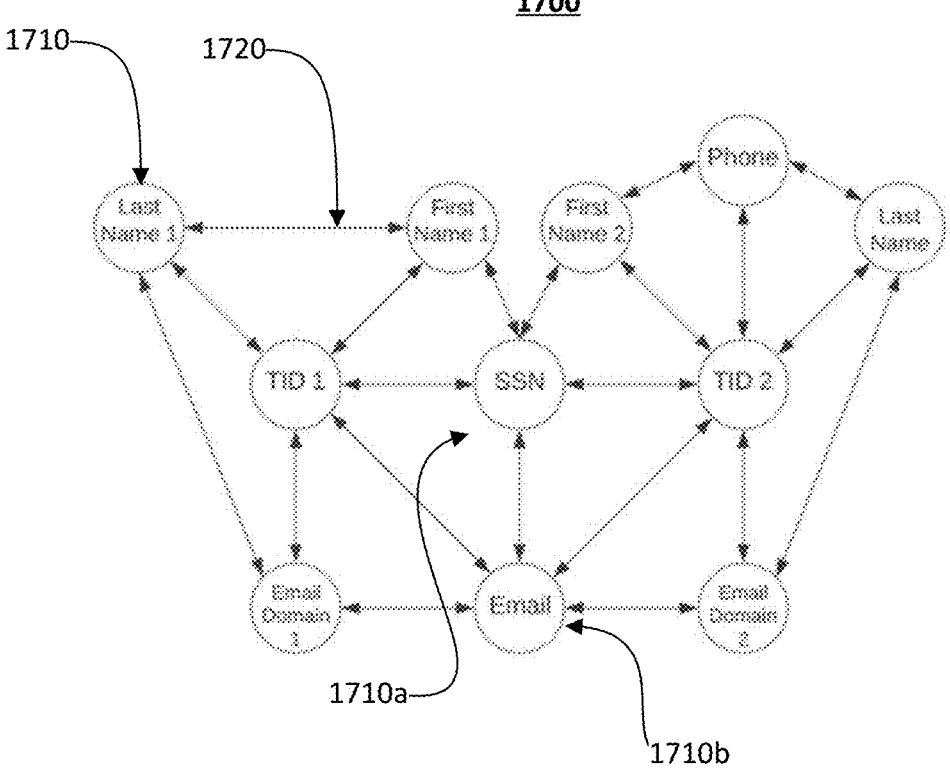
FIG. 17 illustrates an example graph structure of two transactions, according to some aspects described herein.

FIG. 17 illustrates an example graph structure 1700 of two transactions, according to some aspects described herein. The graph structure 1700 includes a plurality of nodes 1710 and a plurality of edges 1720. The plurality of nodes 1710 includes a first node 1710a (e.g., a central node about and at which a first transaction is defined) and a second node 1710b (e.g., a central node about and at which a second transaction is defined). The two transactions share the same first node 1710a (e.g., a social security number "SSN") and second node 1710b (e.g., email). For nodes connected through multiple transactions, the 1st-order neighborhood may be all fields of all connected transactions, as shown in FIG. 17 by either the first node 1710a (e.g., SSN node) or the second node 1710b (e.g., email node).

The 2nd-order neighborhood around a node is all nodes connected by exactly 2 hops (e.g., edges from the plurality of edges 1720) away from each other. This can be shown in FIG. 17, where "TID 1" and "TID 2" are 2nd-order neighbors, and thus are neighboring transactions. Similarly, the Kth-order neighborhood around a node (e.g., from the plurality of nodes 1710) is all nodes exactly K-hops away.

The union of all 1st, 2nd, . . . Kth-order neighborhoods form a subgraph as a region of the full graph (e.g., graph 1700). Since all edges are added twice within the database 1600 (e.g., within the edge table 1620), neighborhoods can efficiently be found by limiting a search to only the first values of a tuple. Effectively, a neighborhood around a node A is the corresponding nodes from all tuple values with A as the first entry. The neighborhood search can be limited further if an edge table (e.g., edge table 1620 of FIG. 16) is ordered by the first node of each tuple. To retrieve neighbors, mechanisms described herein can start at the index of a first edge, wherein a first value in the tuple is A. Then, mechanism described herein can take all sequential edges following the first edge, until the leading tuple value is no longer A. With correct order and indexing such a process can yield all 1st-order neighbors of node A.

Figure 18:
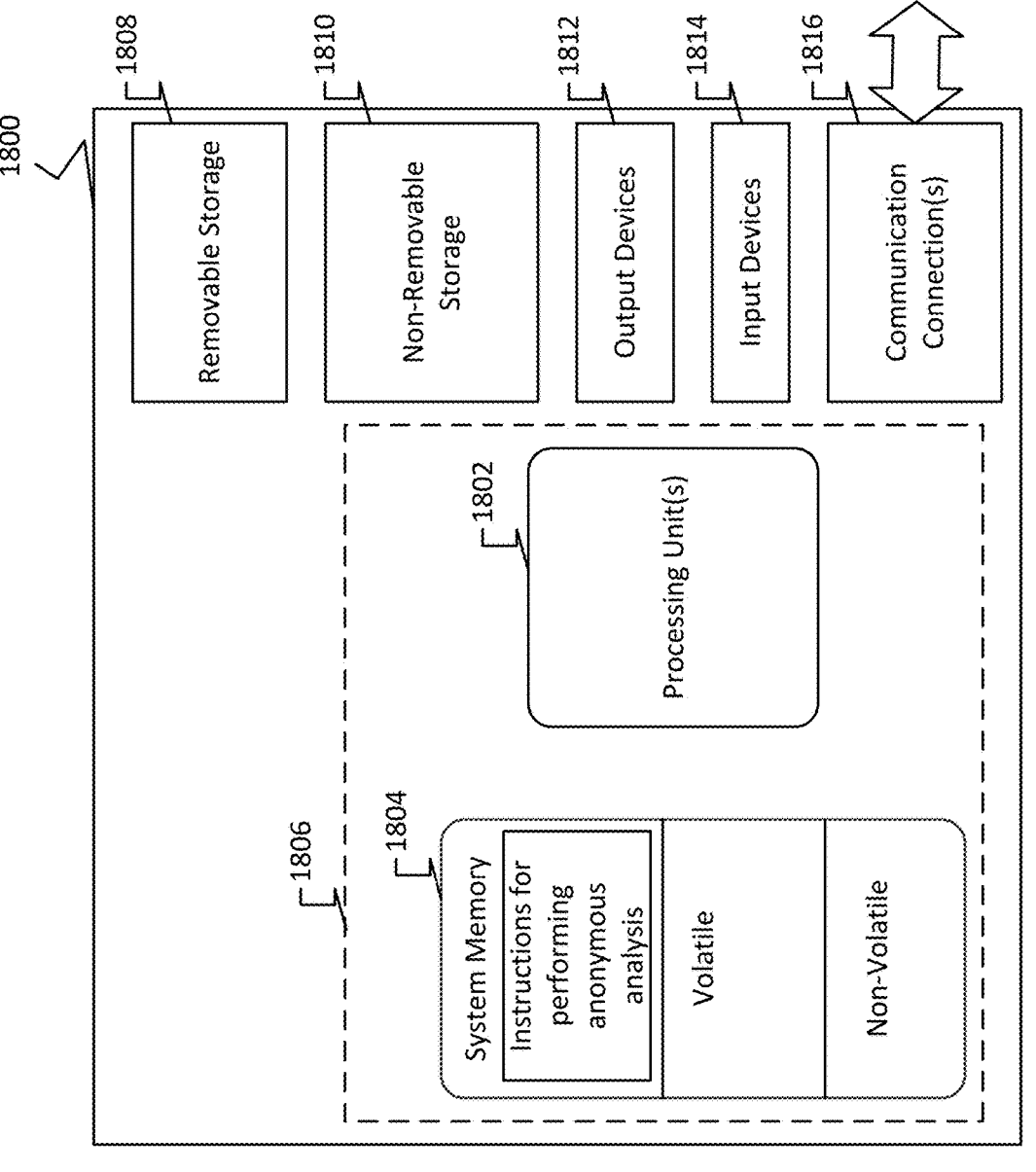
FIG. 18 illustrates a simplified block diagram of a device with which aspects of the present disclosure may be practiced in accordance with aspects of the present disclosure.

FIG. 18 and the associated descriptions provide a discussion of a variety of operating environments in which aspects of the disclosure may be practiced. However, the devices and systems illustrated and discussed with respect to FIG. 18 are for purposes of example and illustration and are not limiting of a vast number of computing device configurations that may be utilized for practicing aspects of the disclosure, described herein.

FIG. 18 illustrates a simplified block diagram of a device with which aspects of the present disclosure may be practiced in accordance with aspects of the present disclosure. The device may be a mobile computing device, for example. One or more of the present embodiments may be implemented in an operating environment 1800. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 1800 typically includes at least one processing unit 1802 and memory 1804. Depending on the exact configuration and type of computing device, memory 1804 (e.g., instructions for performing anonymous analysis as disclosed herein, etc.) may be volatile (such as RAM), non-volatile (such as ROM, flash memory, etc.), or some combination of the two. This most basic configuration is illustrated in FIG. 18 by dashed line 1806. Further, the operating environment 1800 may also include storage devices (removable, 1808, and/or non-removable, 1810) including, but not limited to, magnetic or optical disks or tape. Similarly, the operating environment 1800 may also have input device(s) 1814 such as remote controller, keyboard, mouse, pen, voice input, on-board sensors, etc. and/or output device(s) 1812 such as a display, speakers, printer, motors, etc. Also included in the environment may be one or more communication connections 1816, such as LAN, WAN, a near-field communications network, a cellular broadband network, point to point, etc.

Operating environment 1800 typically includes at least some form of computer readable media. Computer readable media can be any available media that can be accessed by the at least one processing unit 1802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 1800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for anonymizing data. Any of the one or more examples provided herein may be used in combination with any other of the one or more examples provided herein.

In some examples, a method of anonymizing data is provided. The method includes receiving a set of data. The set of data includes a first subset of data that corresponds to a unique identifier (UID), a second subset of data that corresponds to a timestamp, and a third subset of data that corresponds to a personal identifiable information (PII) record. The PII record includes a plurality of fields. One or more of the plurality of fields include values. The method further includes pre-processing the set of data. The pre-processing includes identifying one or more missing fields within the PII record, inputting randomized values into the one or more missing fields, and generating a respective embedding for each value of the one or more of the plurality of fields. The method further includes anonymizing the pre-processed set of data to generate an anonymized set of data, and providing, via a computing device, an output. The output includes one or more indications corresponding to the UID, the timestamp, and the anonymized set of data.

In some examples, the output is received by a database, the output is a graph structure, and the anonymized set of data includes a plurality of anonymized fields that each correspond to a respective field of the plurality of fields. Further, the graph structure includes a central node corresponding to the UID, and a plurality of neighboring nodes that each correspond to a respective anonymized field from the plurality of anonymized fields.

In some examples, the graph structures includes a plurality of edges that extend from each neighboring node of the plurality of neighboring nodes to the central node, and from each neighboring node of the plurality of neighboring nodes to each of the other neighboring nodes of the plurality of neighboring nodes.

In some examples, the method is a method of anonymizing data to train a fraud risk model, and the method further includes training a fraud risk model, based on the database.

In some examples, the fraud risk model is a machine-learning model.

In some examples, each of the embedding is generated within a vector space, and the anonymizing comprises generating a respective hash for each of the embeddings.

In some examples, the hash is a locality sensitive hash (LSH).

In some examples, the hash is a cryptographic hash, and the cryptographic hash is generated based on a 256-bit secure hash algorithm (SHA256).

In some examples, the PII comprises one or more of a name, address, date of birth, government issued identification number, email, phone number, or biometrical data.

In some examples, each of the values of the one or more of the plurality of fields are defined by a plurality of bytes.

In some examples, a system for anonymizing data is provided. The system includes at least one processor, and memory storing instructions that, when executed by the at least one processor, cause the system to perform a set of operations. The set of operations include receiving a set of data. The set of data includes a first subset of data that corresponds to a unique identifier (UID), a second subset of data that corresponds to a timestamp, and a third subset of data that corresponds to a personal identifiable information (PII) record. The PII record includes a plurality of fields. One or more of the plurality of fields include values. The set of operations further include pre-processing the set of data to generate a respective embedding for each value of the plurality of fields, and anonymizing the pre-processed set of data to generate an anonymized set of data. The anonymizing includes generating a respective hash for each of the embeddings. The set of operations further include providing, via the at least one processor, an output. The output includes one or more indications that correspond to the UID, the timestamp, and the anonymized set of data.

In some examples, the pre-processing includes, prior to generating the respective embedding for each value of the plurality of fields: identifying one or more missing fields within the PII record, and inputting randomized values into the one or more missing fields.

In some examples, a method of anonymizing data to train a fraud risk model is provided. The method includes receiving a set of data. The set of data includes a first subset of data that corresponds to a unique identifier (UID), a second subset of data that corresponds to a timestamp, and a third subset of data that corresponds to a personal identifiable information (PII) record. The PII record includes a plurality of fields. One or more of the plurality of fields include values. The method further includes pre-processing the set of data, based on randomization, anonymizing the pre-processed set of data to generate an anonymized set of data, receiving, via a database, one or more indications corresponding to the UID, the timestamp, and the anonymized set of data, and training a fraud risk model, based on the database.

In some examples, the pre-processing the set of data, based on randomization includes identifying one or more missing fields within the PII record, inputting randomized values into the one or more missing fields, and generating a respective embedding for each value of the plurality of fields.

In some examples, the one or more indications that correspond to the UID, the timestamp, and the anonymized set of data form a graph structure, the anonymized set of data includes a plurality of anonymized fields that each correspond to a respective field of the plurality of fields, and the graph structures includes: a central node that corresponds to the UID, a plurality of neighboring nodes that each correspond to a respective anonymized field from the plurality of anonymized fields, and a plurality of edges that extend from each neighboring node of the plurality of neighboring nodes to the central node and from each neighboring node of the plurality of neighboring nodes to each of the other neighboring nodes of the plurality of neighboring nodes.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of anonymizing data, the method comprising:
receiving a set of data, the set of data comprising a first subset of data corresponding to a unique identifier (UID), a second subset of data corresponding to a timestamp, and a third subset of data corresponding to a personal identifiable information (PII) record, the PII record comprising a plurality of fields, one or more of the plurality of fields comprising values;
pre-processing the set of data, the pre-processing comprising:
identifying one or more missing fields within the PII record;
inputting one or more randomized values into the one or more missing fields as one or more randomized parts of the set of data for anonymization; and
generating a respective embedding for each value of the one or more of the plurality of fields;
anonymizing the pre-processed set of data to generate an anonymized set of data, wherein the anonymized set of data comprises embedding of the one or more randomized values; and
providing, via a computing device, an output, the output comprising, as training data to train a fraud risk model, one or more indications corresponding to the UID, the timestamp, and the anonymized set of data.

2. The method of claim 1, wherein the output is received by a database, wherein the output is a graph structure, and wherein the anonymized set of data comprises a plurality of anonymized fields that each correspond to a respective field of the plurality of fields.

3. The method of claim 2, wherein the graph structure comprises a central node corresponding to the UID, and a plurality of neighboring nodes that each correspond to a respective anonymized field from the plurality of anonymized fields.

4. The method of claim 3, wherein the graph structure comprises a plurality of edges that extend from each neighboring node of the plurality of neighboring nodes to the central node, and from each neighboring node of the plurality of neighboring nodes to each of the other neighboring nodes of the plurality of neighboring nodes.

5. The method of claim 3, wherein the method is a method of anonymizing data to train the fraud risk model, and wherein the method further comprises:
training the fraud risk model, based on the database.

6. The method of claim 5, wherein the fraud risk model is a machine-learning model.

7. The method of claim 1, wherein each of the embedding is generated within a vector space, and wherein the anonymizing comprises:
generating a respective hash for each of the embeddings.

8. The method of claim 7, wherein the hash is a locality sensitive hash (LSH).

9. The method of claim 7, wherein the hash is a cryptographic hash, and wherein the cryptographic hash is generated based on a 256-bit secure hash algorithm (SHA256).

10. The method of claim 1, wherein the PII comprises one or more of a name, address, date of birth, government issued identification number, email, phone number, or biometrical data.

11. The method of claim 1, wherein each of the values of the one or more of the plurality of fields are defined by a plurality of bytes.

12. A system for anonymizing data, the system comprising:
at least one processor; and
memory storing instructions that, when executed by the at least one processor, cause the system to perform a set of operations, the set of operations comprising:
receiving a set of data, the set of data comprising a first subset of data corresponding to a unique identifier (UID), a second subset of data corresponding to a timestamp, and a third subset of data corresponding to a personal identifiable information (PII) record, the PII record comprising a plurality of fields, one or more of the plurality of fields comprising values;
pre-processing the set of data to generate a respective embedding for each value of the plurality of fields, wherein the respective embedding comprises one or more randomized values of one or more missing fields in the plurality of fields as one or more randomized parts of the set of data for anonymization;
anonymizing the pre-processed set of data to generate an anonymized set of data, the anonymizing comprising generating a respective hash for each of the embeddings, and the anonymized set of data comprises embedding of the one or more randomized values; and
providing, via the at least one processor, an output, the output comprising as training data to train a fraud risk model, one or more indications corresponding to the UID, the timestamp, and the anonymized set of data.

13. The system of claim 12, wherein the pre-processing comprises, prior to generating the respective embedding for each value of the plurality of fields:

identifying one or more missing fields within the PII record; and inputting randomized values into the one or more missing fields.

14. The system of claim 12, wherein the hash is a locality sensitive hash (LSH).

15. The system of claim 12, wherein the hash is a cryptographic hash, and wherein the cryptographic hash is generated based on a 256-bit secure hash algorithm (SHA256).

16. The system of claim 12, wherein the PII comprises one or more of a name, address, date of birth, government issued identification number, email, phone number, or biometrical data.

17. A method of anonymizing data to train a fraud risk model, the method comprising:

receiving a set of data, the set of data comprising a first subset of data corresponding to a unique identifier (UID), a second subset of data corresponding to a timestamp, and a third subset of data corresponding to a personal identifiable information (PII) record, the PII record comprising a plurality of fields, one or more of the plurality of fields comprising values;

pre-processing the set of data, based on randomization, wherein the randomization comprises inputting a randomized value into a missing field of the one or more of the plurality of fields as a randomized part of the set of data for anonymization;

anonymizing the pre-processed set of data to generate an anonymized set of data, wherein the anonymized set of data comprises embedding of the randomized value;

receiving, as training data for training the fraud risk model, via a database, one or more indications corresponding to the UID, the timestamp, and the anonymized set of data; and training the fraud risk model, based on the database.

18. The method of claim 17, wherein the pre-processing the set of data, based on randomization comprises:

identifying one or more missing fields within the PII record;

inputting randomized values into the one or more missing fields; and generating a respective embedding for each value of the plurality of fields.

19. The method of claim 17, wherein the anonymizing comprises:

generating a respective hash for each of the embeddings.

20. The method of claim 17, wherein:

the one or more indications corresponding to the UID, the timestamp, and the anonymized set of data form a graph structure, the anonymized set of data comprises a plurality of anonymized fields that each correspond to a respective field of the plurality of fields, and the graph structure comprises:

a central node corresponding to the UID, a plurality of neighboring nodes that each correspond to a respective anonymized field from the plurality of anonymized fields, and a plurality of edges that extend from each neighboring node of the plurality of neighboring nodes to the central node and from each neighboring node of the plurality of neighboring nodes to each of the other neighboring nodes of the plurality of neighboring nodes.

* * * * *